US012722662B2

(12) United States Patent
Wong et al.

(10) Patent No.: US 12,722,662 B2
(45) Date of Patent: Sep. 1, 2026

(54) MIXED REALITY SIMULATION FOR AUTONOMOUS SYSTEMS

(71) Applicant: WAABI Innovation Inc., Toronto (CA)

(72) Inventors: Kelvin Wong, Toronto (CA); Simon Suo, Toronto (CA); Raquel Urtasun, Toronto (CA)

(73) Assignee: WAABI CANADA INC., Toronto (CA)

(*) Notice: Subject to any disclaimer, the term of this patent is extended or adjusted under 35 U.S.C. 154(b) by 256 days.

(21) Appl. No.: 18/506,638

(22) Filed: Nov. 10, 2023

(65) Prior Publication Data

US 2024/0157978 A1 May 16, 2024

Related U.S. Application Data

(60) Provisional application No. 63/424,850, filed on Nov. 11, 2022.

(51) Int. Cl.
*B60W 60/00* (2020.01)
*G06F 16/29* (2019.01)

(52) U.S. Cl.
CPC ....... *B60W 60/00274* (2020.02); *G06F 16/29* (2019.01)

(58) Field of Classification Search
CPC ......................... B60W 60/00274; G06F 16/29
See application file for complete search history.

(56) References Cited

U.S. PATENT DOCUMENTS

| | | | | |
|---|---|---|---|---|
| 5,311,173 | A * | 5/1994 | Komura | G01C 21/30 340/995.22 |
| 10,444,763 | B2 * | 10/2019 | Myers | B60W 30/143 |
| 2017/0003507 | A1 * | 1/2017 | Raval | G02B 27/0176 |
| 2017/0123429 | A1 * | 5/2017 | Levinson | B60W 50/00 |
| 2018/0009445 | A1 * | 1/2018 | Nishi | B60W 50/0098 |
| 2020/0139973 | A1 * | 5/2020 | Palanisamy | G06N 3/045 |
| 2021/0035310 | A1 * | 2/2021 | Choi | G06N 3/045 |
| 2021/0197855 | A1 * | 7/2021 | Zhang | G06N 3/08 |

(Continued)

OTHER PUBLICATIONS

Zhou, "SMARTS: An Open-Source Scalable Multi-Agent RL Training School for Autonomous Driving", Proceedings of the 2020 Conference on Robot Learning, 2020 (Year: 2020).*

(Continued)

*Primary Examiner* — Redhwan K Mawari
*Assistant Examiner* — Kai Wang
(74) *Attorney, Agent, or Firm* — Lathrop GPM LLP

(57) ABSTRACT

A method includes obtaining, from sensor data, map data of a geographic region and multiple trajectories of multiple agents located in the geographic region. The agents and the map data have a corresponding physical location in the geographic region. The method further includes determining, for an agent, an agent route from a trajectory that corresponds to the agent, generating, by an encoder model, an interaction encoding that encodes the trajectories and the map data, and generating, from the interaction encoding, an agent attribute encoding of the agent and the agent route. The method further includes processing the agent attribute encoding to generate positional information for the agent, and updating the trajectory of the agent using the positional information to obtain an updated trajectory.

18 Claims, 12 Drawing Sheets

(56) References Cited

U.S. PATENT DOCUMENTS

| | | | | |
|---|---|---|---|---|
| 2022/0169244 | A1* | 6/2022 | Sun | B60W 50/0097 |
| 2022/0226994 | A1* | 7/2022 | Gombolay | B25J 9/1682 |
| 2022/0274625 | A1* | 9/2022 | Garimella | G06N 3/044 |
| 2022/0284619 | A1* | 9/2022 | Brizzi | G06F 18/22 |
| 2023/0298263 | A1* | 9/2023 | Yang | G06T 7/50 382/100 |

OTHER PUBLICATIONS

Luca Bergamini, Yawei Ye, Oliver Scheel, Long Chen, Chih Hu, Luca Del Pero, Blazej Osinski, Hugo Grimmett, and Peter Ondruska. Simnet: Learning reactive self-driving simulations from real-world observations. In ICRA, 2021, 7 pages.

Simon Suo, Sebastian Regalado, Sergio Casas, and Raquel Urtasun. TrafficSim: Learning to simulate realistic multiagent behaviors. In CVPR, Jan. 17, 2021, 18 pages.

Danfei Xu, Yuxiao Chen, Boris Ivanovic, and Marco Pavone. BITS: Bi-level imitation for traffic simulation. In ICRA, Aug. 26, 2022, 19 pages.

Maximilian Igl, Daewoo Kim, Alex Kuefler, Paul Mougin, Punit Shah, Kyriacos Shiarlis, Dragomir Anguelov, Mark Palatucci, Brandyn White, and Shimon Whiteson. Symphony: Learning realistic and diverse agents for autonomous driving simulation. In ICRA, 2022, 7 pages.

Nachiket Deo, Eric Wolff, and Oscar Beijbom. Multimodal trajectory prediction conditioned on lane-graph traversals. In CoRL, 2021, 10 pages.

Eli Bronstein, Mark Palatucci, Dominik Notz, Brandyn White, Alex Kuefler, Yiren Lu, Supratik Paul, Payam Nikdel, Paul Mougin, Hongge Chen, Justin Fu, Austin Abrams, Punit Shah, Evan Racah, Benjamin Frenkel, Shimon Whiteson, and Dragomir Anguelov. Hierarchical model-based imitation learning for planning in autonomous driving. In IROS, 2022, 8 pages.

Ming Liang, Bin Yang, Rui Hu, Yun Chen, Renjie Liao, Song Feng, and Raquel Urtasun. Learning lane graph representations for motion forecasting. In ECCV, 2020, 18 pages.

Davis Rempe, Jonah Philion, Leonidas J. Guibas, Sanja Fidler, and Or Litany. Generating useful accident-prone driving scenarios via a learned traffic prior. In CVPR, 2022, 22 pages.

Niklas Hanselmann, Katrin Renz, Kashyap Chitta, Apratim Bhattacharyya, and Andreas Geiger. KING: generating safety-critical driving scenarios for robust imitation via kinematics gradients. In ECCV, 2022, 15 pages.

* cited by examiner

MIXED REALITY SIMULATION FOR AUTONOMOUS SYSTEMS

CROSS REFERENCE TO RELATED APPLICATIONS

This application is a non-provisional application of, and thereby claims benefit to, U.S. Patent Application Ser. No. 63/424,850 filed on Nov. 11, 2022. U.S. Patent Application Ser. No. 63/424,850 is incorporated herein by reference in its entirety.

BACKGROUND

An autonomous system is a self-driving mode of transportation that does not require a human pilot or human driver to move in and react to the real-world environment. Rather, the autonomous system includes a virtual driver that is the decision making portion of the autonomous system. Specifically, the virtual driver controls the actuation of the autonomous system. The virtual driver is an artificial intelligence system that learns how to interact in the real world and then performs the interaction when in the real world.

In order to interact in the real world, the virtual driver has to be trained. However, training the virtual driver in the real world can be dangerous. Thus, the virtual driver may be trained in the virtual world. One goal of training is to create a realistic virtual world. To create a realistic virtual world, sensor data is used. However, merely replaying sensor data captured in the real world does not capture the effects of decisions made by the virtual driver would have on the real world or the various scenarios that the virtual driver may encounter.

SUMMARY

In general, in one aspect, one or more embodiments relate to a method that includes obtaining, from sensor data, map data of a geographic region and multiple trajectories of multiple agents located in the geographic region. The agents and the map data have a corresponding physical location in the geographic region. The method further includes determining, for an agent, an agent route from a trajectory that corresponds to the agent, generating, by an encoder model, an interaction encoding that encodes the trajectories and the map data, and generating, from the interaction encoding, an agent attribute encoding of the agent and the agent route. The method further includes processing the agent attribute encoding to generate positional information for the agent, and updating the trajectory of the agent using the positional information to obtain an updated trajectory.

In general, in one aspect, one or more embodiments relate to a system that includes a computer processor and a non-transitory computer readable medium for causing the computer processor to perform operations. The operations include obtaining, from sensor data, map data of a geographic region and multiple trajectories of multiple agents located in the geographic region. The agents and the map data have a corresponding physical location in the geographic region. The operations further include determining, for an agent, an agent route from a trajectory that corresponds to the agent, generating, by an encoder model, an interaction encoding that encodes the trajectories and the map data, and generating, from the interaction encoding, an agent attribute encoding of the agent and the agent route. The operations further include processing the agent attribute encoding to generate positional information for the agent, and updating the trajectory of the agent using the positional information to obtain an updated trajectory.

In general, in one aspect, one or more embodiments relate to a non-transitory computer readable medium that includes computer readable program code for causing a computer system to perform operations. The operations include obtaining, from sensor data, map data of a geographic region and multiple trajectories of multiple agents located in the geographic region. The agents and the map data have a corresponding physical location in the geographic region. The operations further include determining, for an agent, an agent route from a trajectory that corresponds to the agent, generating, by an encoder model, an interaction encoding that encodes the trajectories and the map data, and generating, from the interaction encoding, an agent attribute encoding of the agent and the agent route. The operations further include processing the agent attribute encoding to generate positional information for the agent, and updating the trajectory of the agent using the positional information to obtain an updated trajectory.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to mixed reality simulation of scenarios for the training and testing of an autonomous system. In particular, the geographic region includes the agents (including the autonomous system) and various map elements. The map elements are physical portions of the geographical region that may be reflected in a map of the geographic region. The map elements are invariant in one or more embodiments. The agents are the actors in the geographic regions that are capable of independent decision making and/or movement. The agents have corresponding trajectories. For a particular agent, the trajectory may be a real trajectory that includes, relative to the current position and time of the agent, a historical trajectory and a future trajectory. The trajectory defines the agent route of the agent. The agent route is the overall path of the agent specified at a higher level of granularity than the trajectory. For example, the agent route may specify the target location of the agent.

One or more embodiments are configured to generate mixed reality scenarios to generate a simulation. Mixed reality scenarios change the trajectory and/or routes of one or more agents from the actual trajectories and routes detected in the real world and reflected in real world sensor data. To generate the mixed reality scenario, one or more embodiments generate an interaction encoding that encodes the current positions and historical positions of the agents as well as the map data. For each agent with the exception of the autonomous system, one or more embodiments determine the route of the agent. The interaction encoding and the agent route are processed to generate positional information for the agent. By applying the positional information, new trajectories of the agent may be determined. By using the interaction encoding and the agent route rather than just replaying the real scenario, if the virtual driver causes the autonomous system to be in a different position than reflected in the sensor data, then the other agents in the region react realistically to generate one or more new trajectories of agents. Further, modifying one or more agent routes may be used to create new scenarios for testing the virtual driver. Yet further still, by analyzing the new agent routes, safety critical variations may be created from the real world to further test or train the virtual driver.

Figure 1:
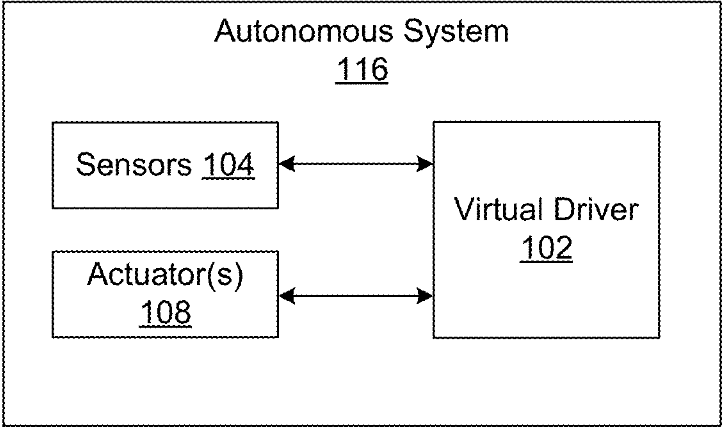
FIG. 1 shows an autonomous system with a virtual driver in accordance with one or more embodiments.
Figure 2:
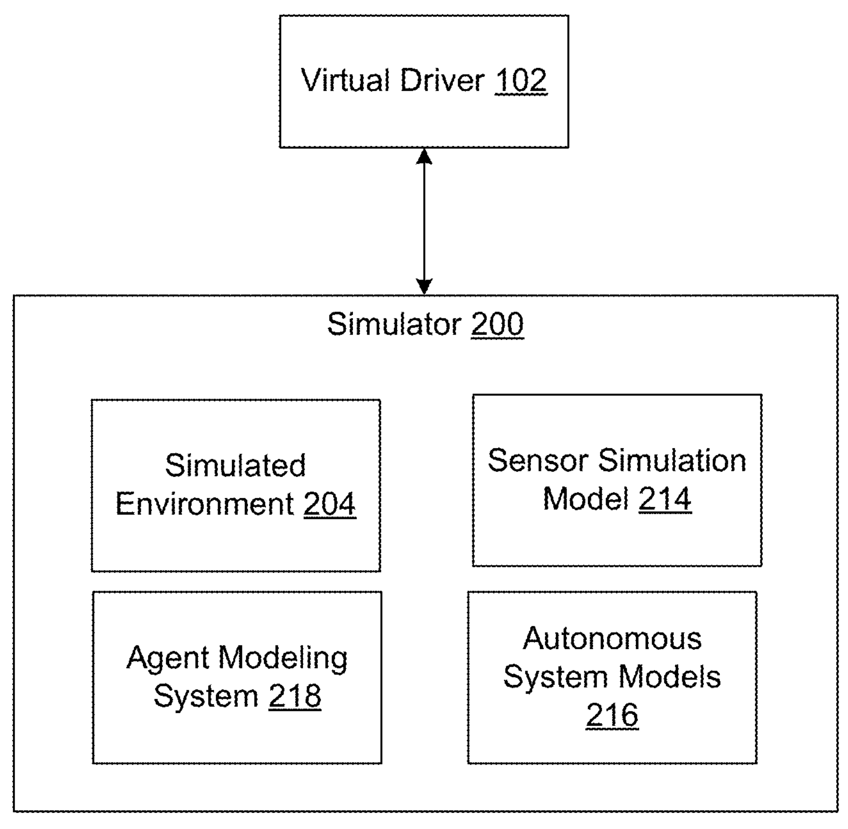
FIG. 2 shows a simulation environment for training a virtual driver of an autonomous system in accordance with one or more embodiments of the invention.

FIGS. 1 and 2 show example diagrams of the autonomous system and virtual driver. Turning to FIG. 1, an autonomous system (116) is a self-driving mode of transportation that does not require a human pilot or human driver to move and react to the real-world environment. The autonomous system (116) may be completely autonomous or semi-autonomous. As a mode of transportation, the autonomous system (116) is contained in a housing configured to move through a real-world environment. Examples of autonomous systems include self-driving vehicles (e.g., self-driving trucks and cars), drones, airplanes, robots, etc.

The autonomous system (116) includes a virtual driver (102) that is the decision making portion of the autonomous system (116). The virtual driver (102) is an artificial intelligence system that learns how to interact in the real world and interacts accordingly. The virtual driver (102) is the software executing on a processor that makes decisions and causes the autonomous system (116) to interact with the real-world including moving, signaling, and stopping or maintaining a current state. Specifically, the virtual driver (102) is decision making software that executes on hardware (not shown). The hardware may include a hardware processor, memory or other storage device, and one or more interfaces. A hardware processor is any hardware processing unit that is configured to process computer readable program code and perform the operations set forth in the computer readable program code.

A real world environment is the portion of the real world through which the autonomous system (116), when trained, is designed to move. Thus, the real world environment may include concrete and land, construction, and other objects in a geographic region along with agents. The agents include autonomous system and the other actors in the real world environment that are capable of moving through the real world environment. Agents may have independent decision making functionality. The independent decision making functionality of the agent may dictate how the agent moves through the environment and may be based on visual or tactile cues from the real world environment. For example, agents may include other autonomous and non-autonomous transportation systems (e.g., other vehicles, bicyclists, robots), pedestrians, animals, etc.

The real world environment changes as the autonomous system (116) moves through the real world environment. For example, the geographic region may change, and the agents may move positions, including new agents being added and existing agents leaving.

In the real world, the geographic region is an actual region within the real-world that surrounds the autonomous system. Namely, from the perspective of the virtual driver, the geographic region is the region through which the autonomous system moves. The geographic region includes actual agents and actual map elements that are located in the real world. Namely, the actual agents and actual map elements each have a physical location in the geographic region that denotes an exact spot or place in which the corresponding agent or map element is located. The map elements are stationary in the geographic region, whereas the agents may be stationary or nonstationary in the geographic region. For example, the map elements may be a curb, a particular lane marker, a particular location between two lane markers or a lane marker and a curb, a light, a stop sign, a construction zone, or one or more other physical object/locations in the geographic region. The map elements may or may not be demarcated in the real world. For example, if the map element is a particular spot in the real world that is between two lane markers, the particular spot exists in the real world and has a physical location, but the particular spot may not have any signposts or other markings in the real world that are at the particular spot. In one or more embodiments, a map of the geographic region directly or indirectly specifies the stationary locations of the map elements.

In order to interact with the real-world environment, the autonomous system (116) includes various types of sensors (104), such as LiDAR sensors amongst other types, which are used to obtain measurements of the real-world environment, and cameras that capture images from the real world environment. The autonomous system (116) may include other types of sensors as well. The sensors (104) provide input to the virtual driver (102).

In addition to sensors (104), the autonomous system (116) includes one or more actuators (108). An actuator is hardware and/or software that is configured to control one or more physical parts of the autonomous system based on a control signal from the virtual driver (102). In one or more embodiments, the control signal specifies an action for the autonomous system (e.g., turn on the blinker, apply breaks by a defined amount, apply accelerator by a defined amount, turn the steering wheel or tires by a defined amount, etc.). The actuator(s) (108) are configured to implement the action. In one or more embodiments, the control signal may specify a new state of the autonomous system and the actuator may be configured to implement the new state to cause the autonomous system to be in the new state. For example, the control signal may specify that the autonomous system should turn by a certain amount while accelerating at a predefined rate, while the actuator determines and causes the wheel movements and the amount of acceleration on the accelerator to achieve a certain amount of turn and acceleration rate.

The testing and training of virtual driver (102) of the autonomous systems in the real-world environment is unsafe because of the accidents that an untrained virtual driver can cause. Thus, as shown in FIG. 2, a simulator (200) is configured to train and test a virtual driver (102) of an autonomous system. For example, the simulator may be a unified, modular, mixed-reality, closed-loop simulator for autonomous systems. The simulator (200) is a configurable simulation framework that enables not only evaluation of different autonomy components of the virtual driver (102) in isolation, but also as a complete system in a closed-loop manner. The simulator reconstructs "digital twins" of real world scenarios automatically, enabling accurate evaluation of the virtual driver at scale. The simulator (200) may also be configured to perform mixed-reality simulation that combines real world data and simulated data to create diverse and realistic evaluation variations to provide insight into the virtual driver's performance. The mixed reality closed-loop simulation allows the simulator (200) to analyze the virtual driver's action on counterfactual "what-if" scenarios that did not occur in the real-world.

The simulator (200) creates the simulated environment (204) which is a virtual world in which the virtual driver (102) is a player in the virtual world. The simulated environment (204) is a simulation of a real-world environment, which may or may not be in actual existence, in which the autonomous system is designed to move. As such, the simulated environment (204) includes a simulation of the objects (i.e., simulated objects or agents) and background in the real world, including the natural objects, construction, buildings and roads, obstacles, as well as other autonomous and non-autonomous objects. The simulated environment simulates the environmental conditions within which the autonomous system may be deployed. The simulated objects may include both stationary and non-stationary objects. Non-stationary objects are agents in the real-world environment.

In the simulated environment, the geographic region is a realistic representation of a real-world region that may or may not be in actual existence. Namely, from the perspective of the virtual driver, the geographic region appears the same as if the geographic region were in existence if the geographic region does not actually exist, or the same as the actual geographic region present in the real world. The geographic region in the simulated environment includes virtual agents and virtual map elements that would be actual agents and actual map elements in the real world. Namely, the virtual agents and virtual map elements each have a physical location in the geographic region that denotes an exact spot or place in which the corresponding agent or map element is located. The map elements are stationary in the geographic region, whereas the agents may be stationary or nonstationary in the geographic region. As with the real-world, a map exists of the geographic region that specifies the physical locations of the map elements.

The simulator (200) includes an autonomous system model (216), sensor simulation models (214), and an agent modeling system (218). The autonomous system model (216) is a detailed model of the autonomous system in which the virtual driver (102) will execute. The autonomous system model (216) includes model, geometry, physical parameters (e.g., mass distribution, points of significance), engine parameters, sensor locations and type, firing pattern of the sensors, information about the hardware on which the virtual driver executes (e.g., processor power, amount of memory, and other hardware information), and other information about the autonomous system. The various parameters of the autonomous system model may be configurable by the user or another system.

The autonomous system model (216) includes an autonomous system dynamic model. The autonomous system dynamic model is used for dynamics simulation that takes the actuation actions of the virtual driver (e.g., steering angle, desired acceleration) and enacts the actuation actions on the autonomous system in the simulated environment to update the simulated environment and the state of the autonomous system. The interface between the virtual driver (102) and the simulator (200) may match the interface between the virtual driver (102) and the autonomous system in the real world. Thus, to the virtual driver (102), the simulator simulates the experience of the virtual driver within the autonomous system in the real world.

In one or more embodiments, the sensor simulation model (214) models, in the simulated environment, active and passive sensor inputs. The sensor simulation models (114) are configured to simulate the sensor observations of the surrounding scene in the simulated environment (204) at each time step according to the sensor configuration on the vehicle platform. Passive sensor inputs capture the visual appearance of the simulated environment including stationary and nonstationary simulated objects from the perspective of one or more cameras based on the simulated position of the camera(s) within the simulated environment. Examples of passive sensor inputs include inertial measurement unit (IMU) and thermal. Active sensor inputs are inputs to the virtual driver of the autonomous system from the active sensors, such as LiDAR, RADAR, global positioning system (GPS), ultrasound, etc. Namely, the active sensor inputs include the measurements taken by the sensors, and the measurements being simulated based on the simulated environment based on the simulated position of the sensor(s) within the simulated environment.

The agent modeling system (218) models agents and creates one or more scenarios. An agent is a sentient being that has an independent decision making process. Namely, in the real world, the agent may be an animate being (e.g., a person or animal) that makes a decision based on an environment. The agent makes active movement rather than or in addition to passive movement. The agent modeling system includes one or more agent models that represents the visual properties of an agent. An agent model, or an instance of an actor model may exist for each agent in a scenario. If the agent is in a mode of transportation, then the agent model includes the model of transportation in which the agent is located. For example, agent models may represent pedestrians, children, vehicles being driven by drivers, pets, bicycles, and other types of agents.

Figure 3:
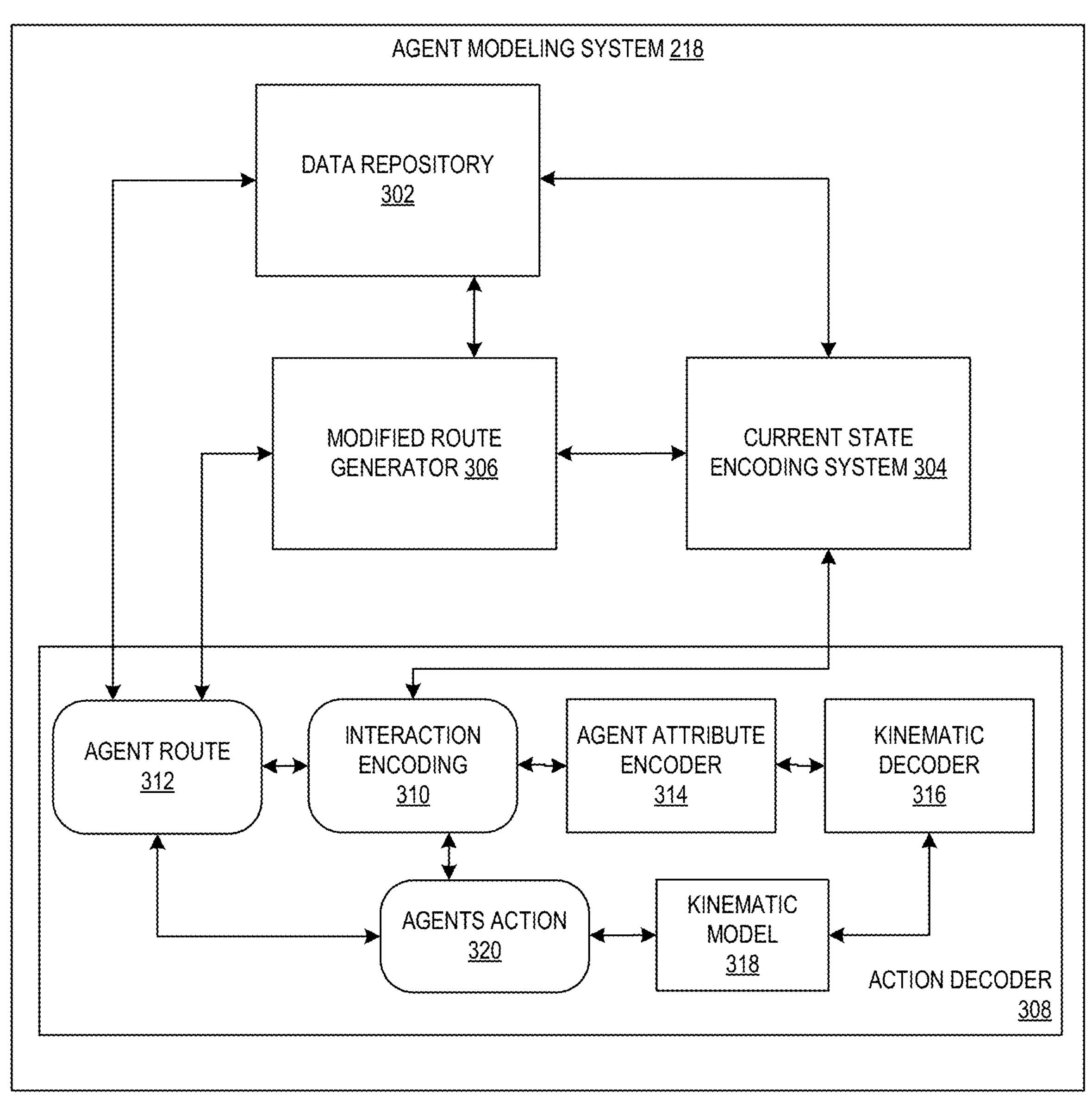
FIG. 3 shows a diagram of the components of a simulator in accordance with one or more embodiments of the invention.
Figure 4:
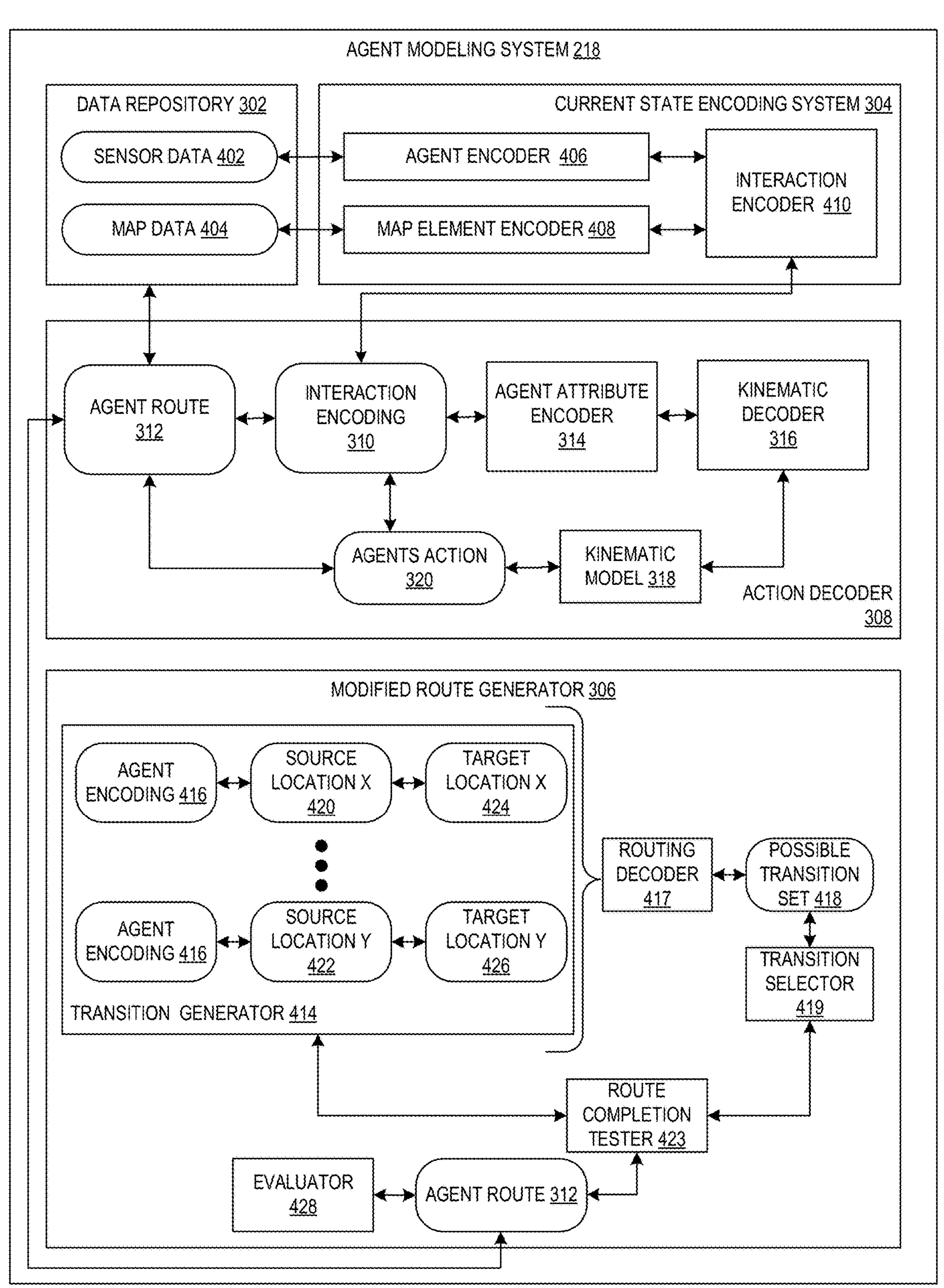
FIG. 4 shows a detailed diagram of the components of a simulator in accordance with one or more embodiments of the invention.

FIGS. 3 and 4 show more detailed diagrams of the agent modeling system (218) in accordance with one or more embodiments. Turning to FIG. 3, the agent modeling system (218) is shown in accordance with one or more embodiments. The agent modeling system (218) includes a data repository (302) connected to a current state encoding system (304) and a modified route generator (306). The current state encoding system and the modified route generator (306) are connected to an action decoder (308). Each of these components is described below.

The data repository (302) is any type of storage unit or device that is configured to store data. For example, the data repository may be a heap, file system, database, physical storage device, any other type of storage structure or unit, or any combination thereof. The data repository (302) includes functionality to store real world data. For example, real world data includes map data describing the layout of the geographic region and agent trajectories that have the trajectories of the agents in the geographic region.

Each agent has a corresponding trajectory. The trajectory may be defined by a series of pairs, each pair having a position and a time that the agent is at the position. The position may be specified, for example, by a bounding box around the agent. The position may also include a pose. The pose may define the heading of the agent. When the agent is stationary, then the trajectory of the agent has the same position and different times for several of the pairs.

A high granularity view from a temporal perspective of the trajectory is the agent route (312). For example, if the agent is a vehicle, the agent route (312) may include turns of the agent, lane changes, or the agent staying straight in the same lane. Thus, the trajectory of the agent captures short term reactions of the agent to a surrounding region and the agent route captures the intent of the agent over time.

The modified route generator (306) is a software system configured to generate a modified agent route (312). In one or more embodiments, the modified route generator (306) is configured to generate a modified agent route (312) that is realistic and explores different possible actions that the agent may take. For example, the modified agent route (312) may be a perturbation of the real world agent route. As another example, the modified agent route (312) may be a completely different route than performed in the real world. In one or more embodiments, the modified route generator (306) is further configured to generate multiple routes and select a subset therefrom that is more realistic or may satisfy one or more criteria, such as being safety critical.

The current state encoding system (304) is a software system configured to generate an interaction encoding (310) of the current state of the geographic region. In one or more embodiments, the interaction encoding (310) is a viewpoint invariant encoding of the real geographic region or simulated environment so that the future trajectories of agents are realistically generated. In one or more embodiments, the interaction encoding (310) is a heterogeneous graph that is a single data structure for the agents and the map elements in the geographic region. In the heterogeneous graph, the physical locations of the agents and the map elements are defined relative to each other. For each of the agents, the heterogeneous graph encodes the agents' current positions relative to past positions of the agent, other agents in the geographic region, and the map. Thus, the interaction encoding (310) encodes agent's current and past interactions with other agents and the map.

Stationary and nonstationary inanimate objects (e.g., loose tire parts, balls, debris, and other inanimate objects lacking decision making abilities) may also be represented as agents in the interaction encoding. However, such inanimate objects are not proactive to other agents and, as such, may be encoded with properties indicating a lack of decision making ability.

The action decoder (308) is software configured to determine agent actions (320) based on the agent route(s)(312) and the interaction encoding (310). In one or more embodiments, the agent actions (320) include a new position of the agent for a next time step. In one or more embodiments, at each timestep, the action decoder (308) independently determines the agent actions for each of the agents that are not the autonomous system. In one or more embodiments, the action decoder (308) includes an agent attribute encoder (314), a kinematic decoder (316), and a kinematic model (318).

The agent attribute encoder (314) is a machine learning model that is configured to generate an encoding of the agent attributes based on an agent encoding in the interaction model. The agent attribute encoding is a vector embedding of the agent attributes. In one or more embodiments, the agent attributes include past kinematic information, current state, as well as the agent route. The agent attributes may further include behavior patterns, such as how aggressive the agent is, the amount of stopping distance that the agent has had, and other information. The agent attribute encoder (314) is configured to learn a relationship between the agent route with the agent encoding and corresponding vector embeddings such that agents with similar agent attributes have similar vector embeddings whereas agents that have different attributes have different vector embeddings.

The kinematic decoder (316) is a machine learning model that is configured to generate positional information for the agent. Specifically, the kinematic decoder (316) is a decoder model that learns how the vector embedding relates to positional information. Positional information of the agent identifies how the agent moves in the next time step. For example, positional information may be kinematic information that includes acceleration and heading (e.g., turn) direction for the next time step. As another example, the positional information may be the new position of the agent at the next time step.

The kinematic decoder (316) may be connected to a kinematic model (318). The kinematic model (318) is configured to translate the kinematic information to the agent action (320). For example, the kinematic model may be a direct motion model that uses the elapse time in the timestep and heading direction to determine a new position for the agent.

FIG. 4 shows a more detailed diagram of various parts of the agent modeling system (218) in accordance with one or more embodiments. Like numbered components in FIG. 4 is the same or substantively similar to the corresponding components of FIG. 2 and FIG. 3. As shown in FIG. 4, the data repository (302) may include functionality to store sensor data (402) and map data (404).

Sensor data (402) is data from one or more sensors. The sensor data may be captured by a real world autonomous or nonautonomous moving system having physical sensors that move through the real world and captures sensor data from the real world. For example, as the moving system moves through the real world, the moving system may capture sensor data from a variety of real world scenarios. The sensor data (402) may include camera images and LiDAR data. The LiDAR data may include information about the distance and direction from the LiDAR sensor to objects (e.g., map elements, agents, and other objects), while the camera data captures the image of the real world. Although not shown in FIG. 4, the system may further include a detector tracker.

A detector tracker is a software process configured to obtain sensor data from the sensor inputs and generate a fixed point view of the geographic region. In one or more embodiments, the detector tracker is configured to generate a bird's eye view of the geographic region based on camera and LiDAR data. For example, the detector tracker may have a convolutional neural network to identify the types of agents from the camera images. The detector tracker may combine the identification of the agents with the LiDAR data to identify the distance to the agents and data from a map to determine an absolute position of the agent with respect to the Earth. The detector tracker may be configured to overlay the agent locations with the map to generate a bird's eye view of the geographic region with the agent in the geographic region.

For each agent, the detector tracker is a software process configured to combine the agent identification with the LiDAR data to track the agent over time and generate a trajectory of the agent. A trajectory of the agent is a time series list of the position(s) of the agent over time. A historical trajectory is historical in that the positions are positions in which the agent was or currently is rather than a future position of the agent in the real world scenario. A future trajectory details how the agent actually moved in the real world scenario. Overall, the trajectory of an agent associates, for multiple time steps in a series of time, a past or current position with the time in which the agent is at the position. The time may be relatively defined to a predefined point in time (e.g., 24 hour clock timestamp, timestamp from the starting of the autonomous vehicle, etc.). The position may be a position relative to a fixed point, such as the position relative to the bird's eye view (e.g., top down view) of the geographic region. Thus, the output of the detector tracker includes a set of trajectories of agents, each associated with an agent identifier. The output of the detector tracker may also include an additional feature set of the agent, such as a type of agent.

The map data (404) identifies the locations of map elements in the real world. In the map data (404), the map elements are identified by geographic positions. The map elements may each also include a set of attributes. For example, the set of attributes may include one or more of the physical properties of the map element itself and regulatory or other such properties of the geographic location in which the map element is located. For example, for roadways, the map element for the center of a lane may include a type of map element, length, width, curvature, speed limit, and lane boundary type.

Continuing with FIG. 4, an agent encoder (406) and a map element encoder (408) are connected to sensor data (402) and map data (404) of the data repository (302). The agent encoder (406) is a software process configured to calculate, for each agent, the relative current position of the agent with respect to past positions of the agent as defined in the agent's historical trajectory. During simulation, the agent's historical trajectory may be different than the agent's real historical trajectory as explained below. In one or more embodiments, rather than a fixed point encoding that spans multiple agents, the relative position encoding is a set of relative positions for an agent that specifies the position of the agent in terms that are relative to the past positions of the agent. Each agent, including the autonomous system, has a relative position encoding. The relative position is defined by the distance between the agent and itself in a previous time and the angle between the headings of the agents. The agent encoder may be further configured to encode, in the agent encodings, the relative positions of the agent into a feature set for the agent in one or more embodiments.

The agent encoder (406) may include a convolutional neural network (CNN) and a recurrent neural network (RNN). The CNN may be a one dimensional CNN with residual connections. The output of the CNN may be passed to an RNN may be a gated recurrent unit (GRU). The final hidden state of the GRU may be the encoding of a particular agent's historical trajectory.

The output of the agent encoder (406) may be agent encodings for the agents that include the autonomous system. The agent encoding of an agent may be stored in a respective agent node for the corresponding agent. Agent nodes may be connected by edges in an agent layer. An agent layer is a graph data structure having agent nodes connected by edges. The edges connecting two agents may have at least one property value defining the relative position of the two agents. The relative position may be defined based on the distance between the two agents and the difference in heading direction. Further, the edge connecting two agent nodes may be an agent position encoding that is generated by encoding the relative position.

In one or more embodiments, the agent layer is a complete graph whereby an agent node is connected to each other agent node. In other embodiments, the agent nodes are only connected to a subset of other agent nodes that satisfy a threshold criterion (e.g., within a threshold distance).

The map element encoder (408) is a machine learning model configured to encode map elements of a geographic region as relative positions with respect to each other. Specifically, the map element encoder (408) is configured to calculate, for each map element, the relative position of the map element with respect to other map elements in the geographic region. Thus, for each map element, a set of relative positions of the map element with respect to other map elements may be defined. The map element encoder (408) may be further configured to encode the relative positions into a feature set for the pair of map elements. Additionally, a map element may have a feature set defining properties of the map element.

The output of the map element encoder (408) may be map element encodings in a map layer of the heterogeneous graph. The map layer is a graph data structure having map element nodes connected by edges. The map element node is for an individual corresponding map element. The edges connecting two map element nodes may be associated with a relative position encoding of the corresponding pair of map element nodes. The map element node may be associated with a feature set that is generated based on the general features of the map element. In one or more embodiments, a map element node for the map element is connected to only a subset of the other map elements in the geographic region, whereby the subset is determined from relative position. For example, the map element node for a map element may be connected to map element nodes in the four directions surrounding the map element (e.g., the immediately preceding map element, the immediately succeeding map element, the map element to the left, and the map element to the right).

The map element encoder (408) may include a graph neural network (GNN). Generally, a GNN is a type of artificial neural network that implements message passing on a graph data structure with nodes and edges. Messages are passed between the nodes and one or more update functions are applied to the messages to generate a new set of values. The update functions may exist for the edges of the graph, the nodes of the graph, and any global features of the graph. The process of updating the graph may be iteratively repeated for multiple rounds of message passing. In the map element encoder, the graph data structure is the map layer described above.

The interaction encoder (410) is a software process configured to generate an interaction encoding (310) from the output of the map element encoder (408) and the agent encoder (406). In one or more embodiments, the interaction encoder (410) is configured to add, to the agent layer and the map element layer, a set of edges connecting agent nodes to map element nodes to generate a heterogeneous graph form of the interaction encoding. The interaction encoder (410) is further configured to update the interaction encoding (310) to encode the overall scene. For example, the updating of the interaction encoding (310) may be to pass messages between the nodes (e.g., map element nodes and agent nodes) and edges to encode the overall scene (e.g., the map, agents, and historical trajectories of agents). The features associated with an edge may be updated to reflect the features of other edges. Because the interaction encoder updates the encoding of map elements and agents based on the interactions, the resulting map element encodings and agent encoding not only encodes one or more of the properties of the particular map element or agent, but also the portions of the environment that may affect a particular map element or agent.

The interaction encoder (410) may include a GNN. The GNN in the interaction encoder (410) may be a different GNN than in the map element encoder (408). For example, the interaction encoder (410) may have different update functions than the map element encoder (408). In one or more embodiments, the interaction encoder has individual linear layers for each edge type. For example, an edge between two agent nodes uses a different linear layer than an edge between two map element nodes, which are both different linear layers than an edge between an agent node and a map element node.

The action decoder (308) and the components of the action decoder (308) in FIG. 4 may be the same or similar to the action decoder (308) in FIG. 3. The agent attribute encoder (314) may be implemented as a GNN that operates on a graph having the agent embedding combined with the map element nodes along the agent route. The kinematic decoder (316) may be implemented as a multilayer perceptron (MLP) model. Generally, an MLP model is a feedforward artificial neural network having at least three layers of nodes. The layers include an input layer, a hidden layer, and an output layer. Each layer has multiple nodes. Each node includes an activation function with learnable parameters. Through training and backpropagation of losses, the parameters are updated and correspondingly, the MLP model improves in making predictions.

As shown in FIG. 4, the agent route (312) may be generated by a modified route generator (306). The modified route generator (306) is configured to generate a modified route from the actual real world route of one or more agents. The modified route generator (306) operates on a per agent basis in one or more embodiments.

As shown in FIG. 4, the modified route generator (306) includes a transition generator (414) connected to a routing decoder (417). The transition generator (414) is configured to generate multiple transitions. Each transition has a source location (e.g., source location X (420), source location Y (422)), a target location (e.g., target location X (424), target location Y (426)), and an agent encoding (416).

The agent encoding (416) is an encoding for a particular agent obtained from the interaction encoding (310). The source location (e.g., source location X (420), source location Y (422)) is the starting point for the transition. The source location and target location may be specified as corresponding map element encodings from the interaction encoding (310).

The routing decoder (417) is a machine learning model configured to generate a score for each transition generated by the transition generator (414). The routing decoder (417) is configured to create a possible transition set (418). A possible transition set is a set of possible transitions that the particular agent may perform. Each possible transition in the possible transition set has a corresponding score. The transition selector (419) is configured to select one or more transitions from the possible transition set. For example, the transition selector (419) may be configured to sample the transitions based on the corresponding scores of each possible transition.

A route completion tester (423) is configured to test whether the route is completed. For example, the route completion tester may test whether the number of timesteps in the route generated thus far is greater than or equal to the number of timesteps in the scenario or to test whether the agent leaves the geographic region by the transition.

The output of the modified route generator (306) is one or more agent routes (312). Each agent route (312) corresponds to a separate scenario for testing or training the virtual driver.

The agent route (312) is connected to an evaluator (428). The evaluator (428) is configured to evaluate and filter the agent routes. For example, the evaluator (428) may be configured to perform the evaluation against a set of criteria.

As shown, the mixed reality simulator is a machine learning framework that is configured to learn how agents act in the real world, modify agents to respond to the virtual driver, create realistic scenarios, and create scenarios satisfying one or more criteria.

While FIGS. 1-4 show a configuration of components, other configurations may be used without departing from the scope of the invention. For example, various components may be combined to create a single component. As another example, the functionality performed by a single component may be performed by two or more components.

Figure 5:
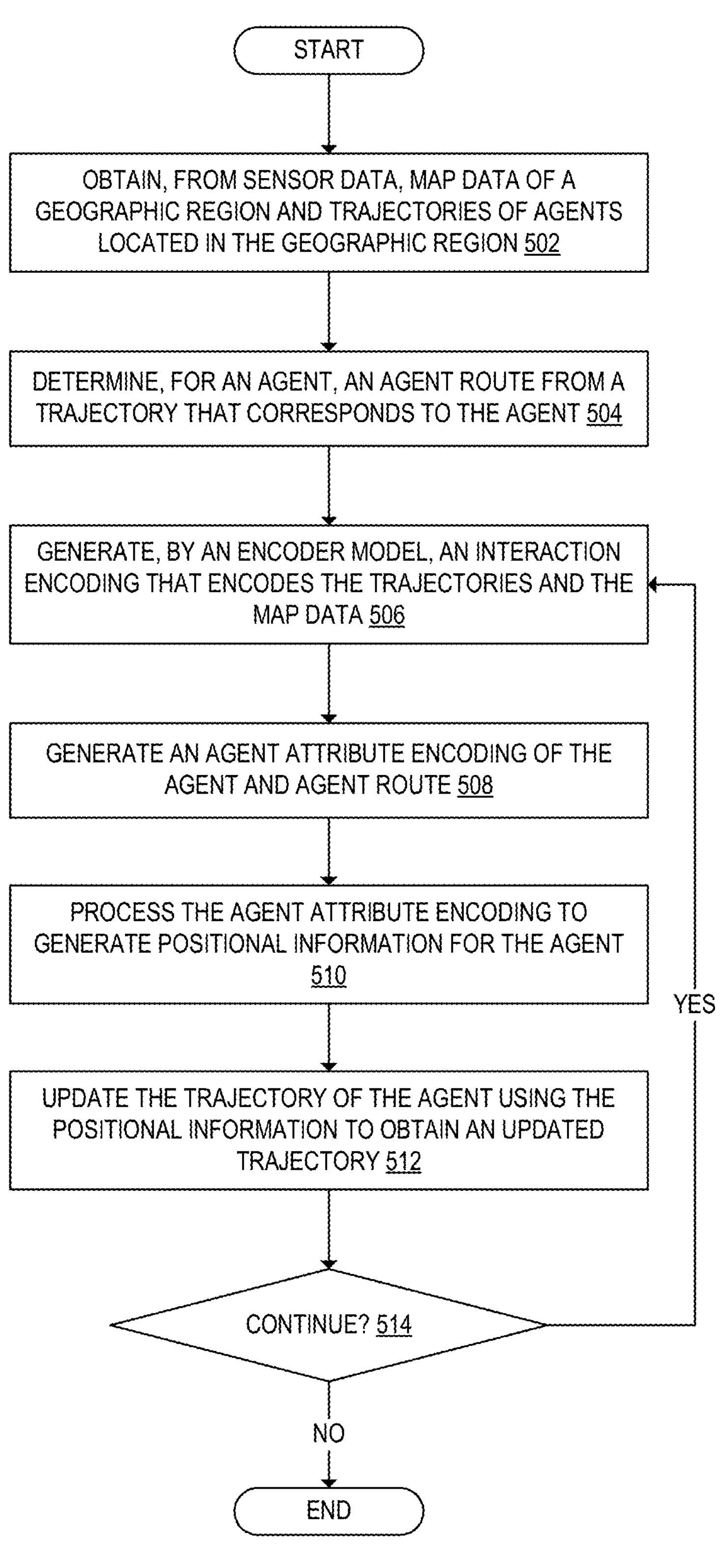
FIG. 5 shows a flowchart for mixed reality simulation for autonomous systems in accordance with one or more embodiments of the invention.
Figure 6:
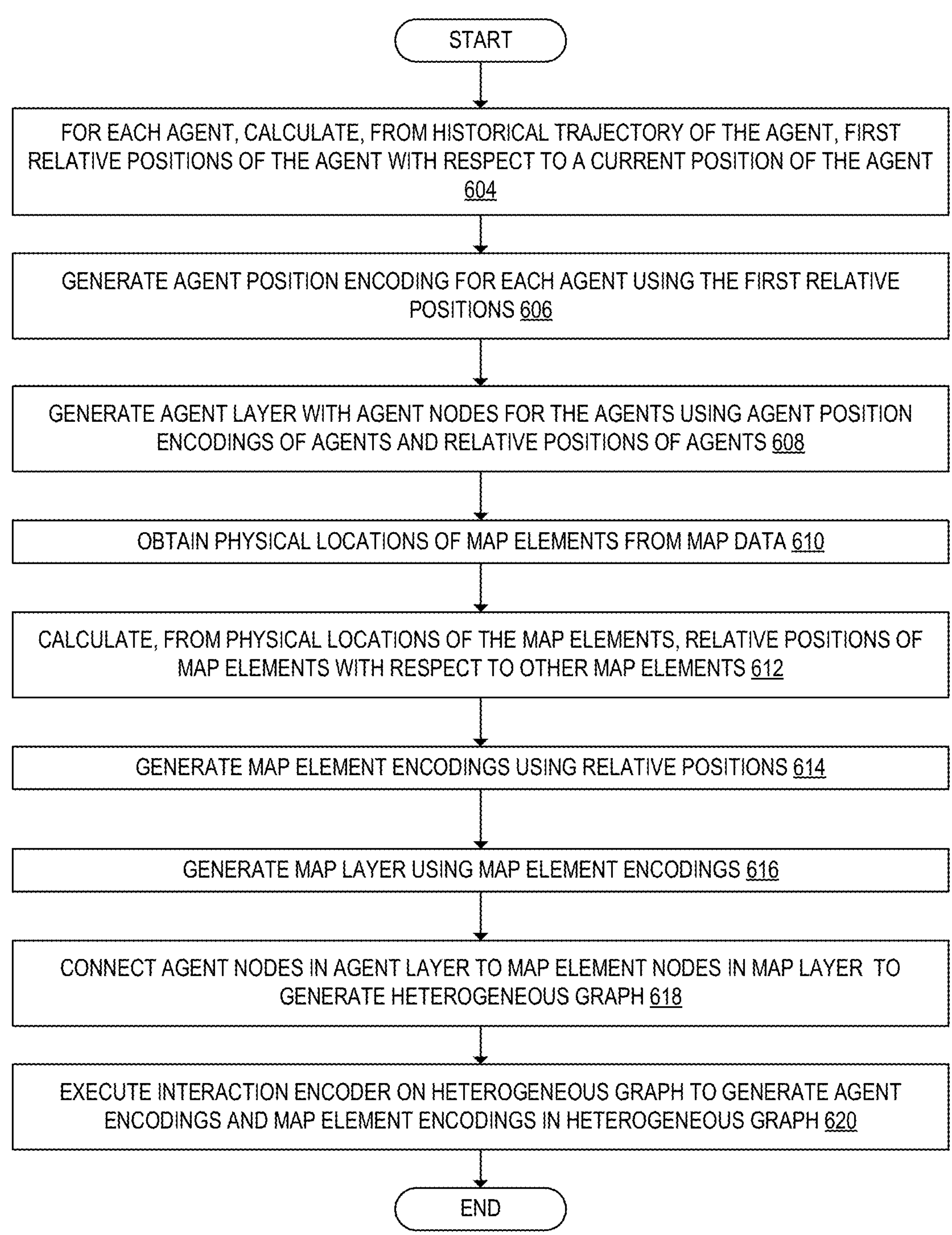
FIG. 6 shows a flowchart for building a heterogeneous graph in accordance with one or more embodiments of the invention.
Figure 7:
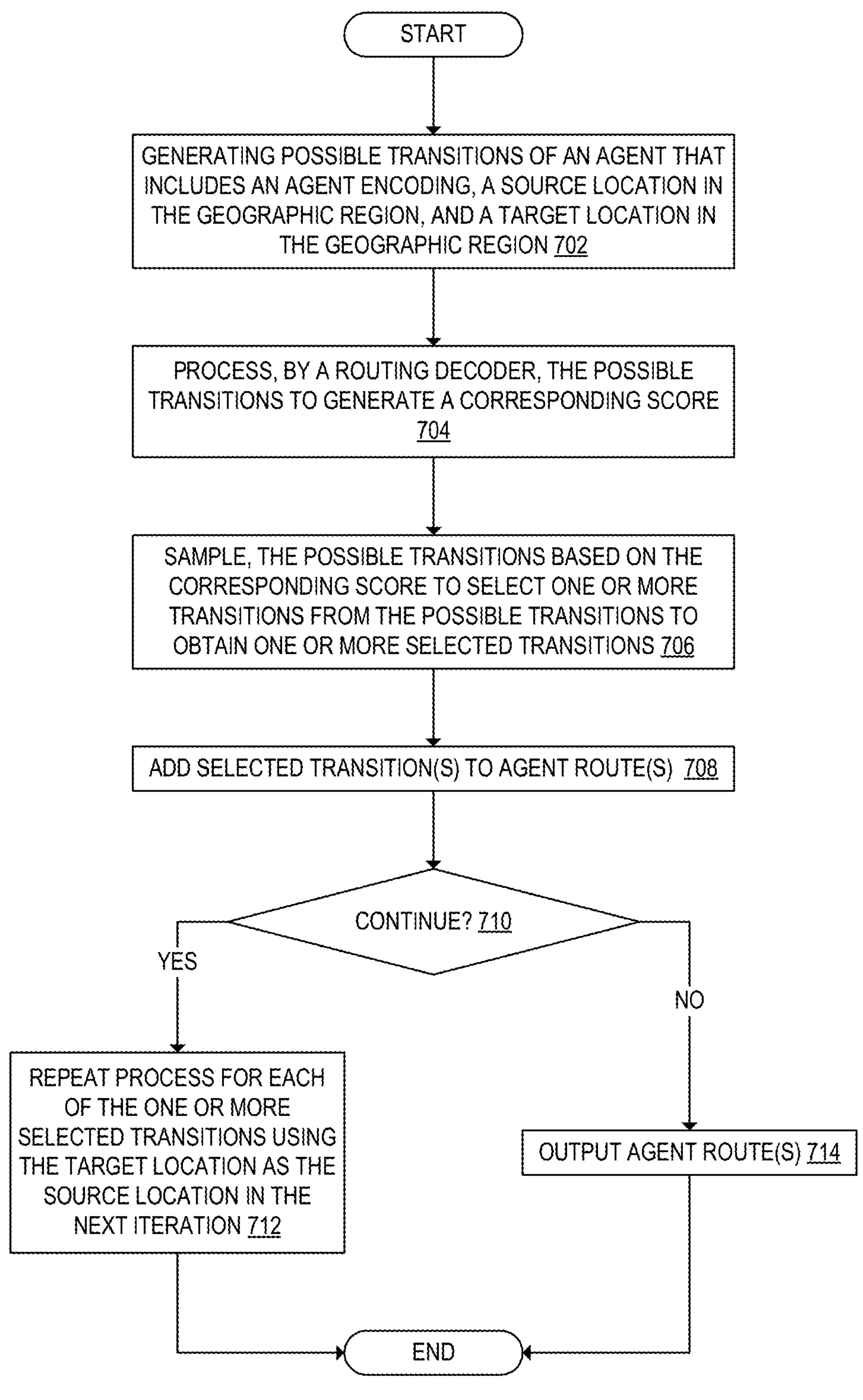
FIG. 7 shows a flowchart for generating multiple agent routes in accordance with one or more embodiments of the invention.

FIGS. 5-7 show flowcharts in accordance with one or more embodiments. While the various steps in these flowcharts are presented and described sequentially, at least some of the steps may be executed in different orders, may be combined or omitted, and at least some of the steps may be executed in parallel. Furthermore, the steps may be performed actively or passively.

FIG. 5 shows a flowchart for mixed reality simulation for autonomous systems in accordance with one or more embodiments of the invention. In Block 502, from sensor data, map data of a geographic region and trajectories of agents located in the geographic region are obtained. The agents and the map data have a corresponding physical location in the geographic region. In one or more embodiments, the historical trajectories are obtained from another system. In some embodiments, the historical trajectories may be obtained by the detector tracker generating the historical trajectories from input sensor data. For example, sensor data may be captured from various sensors on a moving system that moves through an environment. The sensors on the moving system capture real world data of various scenarios. The detector tracker may obtain the sensor data and process the sensor data. The detector tracker identifies and tracks various agents including the moving system through the environment. Thus, the detector tracker generates several trajectories. Further, map data is obtained for the real world geographic region. The map data may be obtained from a map repository based on the geo-positioning system (GPS) location on the moving system.

In Block 504, for an agent, an agent route is determined from a trajectory that corresponds to the agent. The agent route may be individually determined for each agent in the geographic region. The real world agent route may be used, or the agent route may be generated. For example, for some agents, the real world agent route is used while, for other agents, a generated agent route may be used. Different techniques may be used to determine the real world agent route. For example, the real world agent route may be determined by sampling the trajectory at a higher level of granularity than the trajectory itself. For example, if the trajectory specifies the positions of agents at every second, the trajectory may be sampled at every five seconds. As another example, the starting and ending location of the agent in the trajectory may be used as the agent route.

When generating a new agent route, a set of agent routes may be generated for the same agent. Further, multiple agents may each have a corresponding set of multiple agent routes. Each permutation of the agent routes selected from the real world and the set may correspond to an individual scenario whereby each agent has a single corresponding agent route. Thus, by generating multiple agent routes, the same real-world scenario may spawn several virtual scenarios that may be individually tested. The process of FIG. 5 is for an individual scenario.

In Block 506, an encoder model generates an interaction encoding that encodes the trajectories and the map data. At each timestep of the simulation, the current time and state of the scenario are identified. The state of the scenario is the position of each of the agents in the geographic region. For the first timestep, the trajectories obtained in Block 502 may be used. In subsequent iterations, the trajectories that are used may be the trajectories modified by the simulations. In one or more embodiments, the portions of the trajectories of the agents prior to and including the current time and state are used. The portions of the trajectories of the agents prior to and including the current time and state are the historical trajectories. Using the historical trajectories may be performed because agents do not operate on future data, but only on what is done in the past. Thus, simulating the agents' actions is performed by using knowledge that the agent would have in the real world.

In one or more embodiments, generating the interaction encoding is performed as follows. From historical trajectories of agents and map data, a heterogeneous graph of agents having positions defined with respect to other agents and map elements having positions defined relative to each other is built. Each agent is associated with a corresponding individual agent node. The current location of each agent as specified in the agent's historical trajectory is compared to the current location of each other agent as specified in the other agent's historical trajectory. In one or more embodiments, pairs of agents that are greater than a threshold distance to each other are excluded from further analysis. Remaining pairs of agents each have an edge added between the corresponding agent nodes of the pair. The edge is associated with the relative position of the two agents with respect to each other to generate the agent layer of the heterogeneous graph. A similar process may be performed for map elements to generate the map layer of the heterogeneous graph. The agent layer and the map layer may be linked by connecting, using an edge, each agent node to each map element node of a corresponding map element that is closest to or within a threshold distance to the corresponding agent. The relative position between the agent and the map element may be calculated and added to the new edge. The resulting graph may be processed by a graph neural network.

In Block 508, an agent attribute encoding of the agent and the agent route is generated. In one or more embodiments, the agent attribute encoding is generated from a combination of the agent encoding and the map elements encodings. From the interaction encoding, an agent encoding of the agent is extracted. The agent encoding is obtained from the agent node of the particular agent in one or more embodiments. Similarly, map element encodings are extracted from the heterogeneous graph for each map element along the agent route. In one or more embodiments, a combined graph is generated. The combined graph connects the map elements nodes along the agent route to each other in the same order as in the heterogeneous graph. Thus, the combined graph may be a subgraph of the heterogeneous graph. In some embodiments, nodes in the sub-graph may be omitted when the nodes are not specified in the agent route (e.g., because the agent route is at a higher level of granularity than the trajectory or the map layer). Further, the agent node may be added to the combined graph and connected in a same way as in the heterogeneous graph of the interaction encoding. The combined graph may be processed by a graph neural network to generate the agent attribute encoding.

In Block 510, the agent attribute encoding is processed to generate positional information for the agent. The agent encoding may be combined with the agent attribute encoding. For example, the agent attribute encoding is concatenated with the agent encoding to generate a combined result. The combination may be processed by an MLP model that is trained to generate positional information for the agent.

In Block 512, the trajectory of the agent is updated using the positional information to obtain an updated trajectory. For example, the positional information may specify a new agent position of the agent. In such a scenario, the trajectory of the agent is updated by adding the new position to the trajectory.

In some embodiments, the agent attribute encoding is kinematic information. In such a scenario, the kinematic information is processed to determine a new agent position of the agent. For example, the kinematic information may the acceleration and turning direction of the agent. A kinematic model uses the kinematic information to determine the new position of the agent. The kinematic model may use the current velocity of the agent, the acceleration, and the turn direction along with the length of a timestep to determine the new location of the agent in the absence of obstacles. The timestep may be small enough that a single turn direction accounts for the path of the agent throughout the timestep (e.g., specified in milliseconds). The kinematic model may take into account other agents and map elements to determine whether an obstacle is encountered and adjust accordingly. For example, the result of Block 510 is the reaction of the agent based on the agent route and the current state of the system. The kinematic model may account for whether a collision occurs, or other issue exists that prevents the agent from completing the agent action.

Blocks 508-512 are performed for each agent with the exception of the virtual driver. The interaction encoding may be shared when performing the remaining Blocks of FIG. 5.

In Block 514, a determination is made whether to continue. The determination is made to continue if the simulation of the scenario is incomplete (e.g., if a stop condition has not yet been reached). For example, the stop condition may be an accident of the autonomous system caused by the virtual driver. If the determination is made to continue, the process continues with Block 506 of FIG. 5. If the determination is made not to continue, the process ends in FIG. 5. The actions of the virtual driver may be evaluated to generate losses that are used to update one or more components of the virtual driver.

FIG. 6 shows a flowchart for building a heterogeneous graph to use as the interaction encoding in accordance with one or more embodiments of the invention. FIG. 6 shows the operations of Block 506 of FIG. 5 in some embodiments. Blocks 604-608 describe building an agent layer. The processing is performed for each of at least a subset of agents. Each agent is related to an agent node. In one or more embodiments, a one-to-one correspondence may exist between agents and agent nodes.

In Block 604, for each agent, from the historical trajectories of the particular agent, the first relative positions of the particular agent with respect to the current position of the particular agent are calculated. From the current location and heading of the particular agent and a previous location and the heading at the previous location of the particular agent, the relative distance and angle between heading directions are determined. For each agent individually, the intermediate result is a relative current position as compared to the previous position of the particular agent. The process may be repeated for each previous position of the particular agent in the trajectory. For each agent individually, the result is second relative positions of the particular agent that are relative to the previous positions of the particular agent. The first relative positions may be added as an edge of the agent node of the particular agent to itself or added as a property of the agent node of the particular agent.

In Block 606, an agent position encoding for each agent is determined using the first relative positions. A single agent position encoding may be generated, or multiple agent position encodings may be generated for each agent. For the first relative positions, the first relative positions may be concatenated into a vector ordered by the time at which the agent was at the relative positions. The vector may then be encoded. Encoding a position may be performed using a neural network, such as the CNN and RNN described above.

In Block 608, an agent layer is generated using the agent position encodings of the agents and the relative positions of the agents. Agents may be connected to each other based on the second relative position of each agent with respect to the other agents. From the current location and heading of the agent and the current location and heading of another agent as specified in the corresponding agent trajectories, the relative distance and angle between heading directions is determined. The result is a relative position of the particular agent to another particular agent. If the relative distance is less than a threshold, then an edge is added between the agents. The relative position is associated with the added edge. The result is, for each agent, a set of edges from the agent node of the agent to the agent node of other agents with the first relative positions.

Continuing with FIG. 6, Blocks 610-616 are directed to generating the map layer. The process of Blocks 610-616 in some embodiments may be performed all or in part prior to performing the agent encoding. For example, if the map does not change, then the map encoding may be performed offline. As another example, certain parts that are immutable, such as map elements between or corresponding to lane markers may be performed offline while other elements are performed in real time.

In Block 610, the physical locations of map elements are obtained from the map data. In some embodiments, one or more of the map elements are determined from the map data. For example, if the map data includes lane makers, the map elements may be a defined geographic spot between two lane markers.

In Block 612, from the physical locations of the map elements, the relative positions of the map elements with respect to other map elements are calculated. Calculating the relative positions of the map elements may be performed in a similar manner as discussed above with regard to calculating the relative positions of agents.

In Block 614, map element encodings are generated using the relative positions. The map element encodings encode the features of the map element and encode the relative position.

In Block 616, a map layer is generated using the map element encodings. Each map element corresponds to a map element node in the map layer. The map element nodes are connected by edges based on adjacency between the map element nodes. The edge between two map element nodes is associated with a relative position between the two corresponding map elements to generate the map layer. Further, the GNN may be applied to the map layer to further update the map layer.

In Block 618, agent map edges are added by the agent layer and the map layer to generate a heterogeneous graph. In one or more embodiments, an edge is added between an agent node and a map element node when the corresponding agent is within a threshold distance to the corresponding map element as defined by the map and the current position in the historical trajectory of the agent. As another example, an edge may be added between an agent node and a map element node when the corresponding map element is adjacent to the corresponding agent. Different techniques may be used to determine which map elements to add to which corresponding agents.

By way of an example of the node connections, consider the following.

$$x_i^p,$$

and $$x_j^p$$

may each be an agent node or a map element node. Each node in the heterogeneous graph has a pose $$x_i^p,$$

which is composed of a centroid $c_i$ and a unit vector in the heading direction $h_i$. To represent the directional, pairwise relationship between node i and j (i.e., i→j), the displacement vector between each node's centroids $v_{i\rightarrow j}=c_i-c_j$ as well as the sine and cosine of the heading difference may be computed in the following set of equations (1).

$$\sin(\alpha_{i\rightarrow j})=h_i\times h_j,\ \cos(\alpha_{i\rightarrow j})=h_i\cdot h_j \tag{1}$$

The displacement vector $v_{i\rightarrow j}$ depends on the arbitrary global frame the centroids are expressed in, and thus is not viewpoint invariant. To achieve invariance, one or more embodiments may utilize the centroid distance $d_{i\rightarrow j}=\|v_{i\rightarrow j}\|^2$, together with the sine and cosine of the angle between the displacement vector $v_{i\rightarrow j}$ and the heading $h_j$.

To make the centroid distances bounded, one or more embodiments may map each distance to a vector $p_{i\rightarrow j}=[p_1, \ldots, p_N, r_1, \ldots, r_N]$ composed of sine and cosine functions of N different frequencies that represent the range of distances that embodiments may be interested in (e.g., a few meters to hundreds of meters). More concretely, the vector may be represented using the following equations (2).

$$p_n = \sin\left(d_{i \to j}\exp\left(\frac{4n}{N}\right)\right),\ r_n = \cos\left(d_{i \to j}\exp\left(\frac{4n}{N}\right)\right) \tag{2}$$

The pair-wise geometric relationship of entities i and j can be summarized as a concatenation (⊕) using equation (3).

$$g^a_{i \to j} = [\sin(\alpha_{i \to j}), \cos(\alpha_{i \to j}), \sin(\beta_{i \to j}), \cos(\beta_{i \to j})] \oplus p_{i \to j} \tag{3}$$

The final positional encoding may be learned using equation (4).

$$e^a_{i \to j} = MLP(g^a_{i \to j}) \tag{4}$$

In the above equations, $d_{i \to j}$ is the distance between node i and node j, $\alpha_{i \to j}$ is the angular difference between the angles of heading of the node i compared to node j, $\beta_{i \to j}$ is the angular difference between an angle of the heading of the second agent relative to a straight line measured by distance vector $d_{i \to j}$ between the node i and node j.

After calculating the values for $d_{i \to j}$, $\alpha_{i \to j}$, and $\beta_{i \to j}$, the vector $$g^a_{i \to j}$$

may be generated using equations (2) and (3). Then, the vector may be encoded using the MLP model to generate the edge value $$e^a_{i \to j}$$

that is used for the edge between node i and node j. The process may be repeated for each edge between nodes (e.g., agent node or map element node) in the graph structure (e.g., heterogeneous graph, agent layer, map element layer). The result is a set of initial values for the edges of the graph structure.

In Block 620, an interaction encoder is executed on the heterogeneous graph to generate agent embeddings and graph embeddings in the heterogeneous graph. A GNN may be applied to the heterogeneous graph generated in Block 618. By applying the GNN, each edge and agent node have encodings that reflect not only information about relative positions between adjacent nodes in the heterogeneous graph but also information about relative positions between other adjacent nodes including the past positions of the agent nodes. Thus, from the perspective of a particular agent, the heterogeneous graph includes information that both directly and indirectly affects the particular agent. By way of an example, a lane closure affecting another agent may affect the particular agent when the other agent moves into the lane of the particular agent. Using the GNN, the edges connected to the agent may include features that are affected by the lane closure. The output of the interaction encoder is a set of agent encodings and a set of graph embeddings. Specifically, each agent node has an agent encoding in the set of agent encodings and each map element node has a graph embedding in the set of graph embeddings.

For example, consider the scenario in which car A, car B, and car C are in the geographic region. Each car is an agent having a corresponding agent node. Car A and car B have a first relative position to each other, and car B and car C have a second relative position to each other. Car B will move based on car A and car C, car A will move based on car B and car C, and car C will move based on car A and car B. However, car A may also move based on a projected movement of car B to car C. For example, if the relative position of car B to car C is within a collision distance, then a movement of car B to avoid the collision may affect car A. Namely, if car B is projected to move by car A, the car A may also move based on car A's projection of car B's movement. The interaction encoding encodes for car A, the relative distances between car B and car C through the message passing and the GNN. By not only having the encodings of the relative distances but also updating the GNN through multiple iterations of message passing, the interaction encoding has an encoding that encodes multiple levels of relative positions of the agents with respect to each other and with respect to map elements.

FIG. 7 shows a flowchart for generating multiple agent routes in accordance with one or more embodiments of the invention. In Block 702, possible transitions of an agent that includes an agent encoding, a source location in the geographic region, and a target location in the geographic region are determined. Initially, the source location may be the real world location of the agent in one or more embodiments. Alternatively, if a new agent is added, the source location may be a virtual location in which the agent is added. The target location is the ending location of the agent at the end of the transition. For the next transition on the route, the target location of the prior transition is the source location of the next transition.

To determine the possible transitions, an assumption may be made that the agent may move from any map element to any other map element to which the corresponding map element nodes are connected in the map layer of the graph. For example, a map element may have more than one succeeding or preceding map element (e.g., in the case of a turn, a lane merge, or a lane separation). Similarly, because an agent may change lanes, the map element may be connected to map elements in other lanes. Each different target map element corresponds to a possible transition. Thus, while the source map element may be the same in each transition, the target map element may be different. The agent encoding, source location, and target location may be combined to generate input data. For example, the agent encoding may be concatenated with map element encodings of the source map element and the target map element. The encodings may be the initial encodings obtained from the interaction encoding at the start of the scenario.

In Block 704, a routing decoder decodes the possible transitions to generate a corresponding score. In one or more embodiments, a machine learning model, such as an MLP model, processes each possible transition to generate a score. For example, the MLP model may independently process the possible transitions to generate a score for the possible transition.

In Block 706, the possible transitions are sampled based on the corresponding score to select one or more transitions from the possible transitions and to obtain one or more selected transitions. In one or more embodiments, a greedy sampler is applied to the possible transitions. The greedy sampler uses the score as the probability for selecting the particular transitions. Other sampling strategies may be used without departing from the scope of the invention.

In Block 708, the selected transition is added to the agent route. If multiple transitions are selected, then multiple copies of the agent route thus far are created, and each selected transition is appended to a copy of the multiple copies.

In Block 710, a determination is made whether to continue. The determination may be based, for example, on an agent leaving the geographic region, a number of transitions, or other information.

If the determination is made to continue, the process is repeated for each of the one or more selected transitions using the target location as the source location in the next iteration in Block 712. Specifically, FIG. 7 may be recursively performed for each selected transition in Block 706 using the updated agent route generated in Block 708 as the current agent route. For example, if five transitions are selected, then FIG. 7 may be recursively performed five times independently for each of the selected transitions to create five scenarios (i.e., the current scenario plus four more by the alternative transitions). If a determination is made not to continue, then one or more agent routes are outputted. Agent routes for different agents may be combined to create a mixed reality scenario. The mixed reality scenario may be executed as shown in FIG. 6 to determine how each agent would behave.

In one or more embodiments, the agent routes may be analyzed to identify a subset having a safety critical scenario. For example, the agent routes may be compared to each other to find agent routes that are within threshold distances to each other or to the autonomous system. The agent routes may be filtered to remove easy routes and to test the autonomous system on the safety critical routes.

FIGS. 8-11 and the corresponding description below show an example in accordance with one or more embodiments. The following examples are for explanatory purposes only and are not intended to limit the scope of the invention.

Given a reference scenario, one or more embodiments build a reactive and controllable digital twin that allows for the re-simulation of the scenario and the exploration of what-if variations. The digital twin should preserve the high-level behaviors and interactions of the original scenario (e.g., taking an off-ramp) but not the specific trajectories themselves (e.g., braking to avoid a collision). This motivates explicitly modeling each agent's unobserved goal $g_i$ in the generative process of traffic scenarios. Concretely, one or more embodiments start with, $$g_i \sim h_i(\cdot|s_0, m) \tag{5}$$

where $h_i$ is a prior over the i-th agent's goal given the initial state $s_0$. A scenario unrolls over time according to independent goal-directed agent policies $\pi_i$ and dynamics f, $$a_{i,t} \sim \pi_i(\cdot|s_t, m, g_i) \tag{6}$$

$$s_{t+1} \sim f(\cdot|s_t, m, a_t) \tag{7}$$

By varying each agent's goal $g_i$, one or more embodiments can simulate various mixed reality traffic scenarios. Under this model, re-simulating a reference scenario amounts to inferring each agent's goals (e.g., routes) from its observed behaviors and then unrolling the conditional distribution described in Equations (6) and (7). Furthermore, by sampling from the prior over goal $h_i(g_i|s_0, m)$, we can automatically generate realistic variations of the reference scenario. Finally, by searching over agent goals with black box optimization, one or more embodiments can automatically discover safety critical yet realistic variations. This allows us to expand the set of possible re-simulations from exploring what has happened to what could have happened.

One or more embodiments represent each agent's high-level unobserved goals by a route along the road network. Specifically, the high definition map may be represented as a lane graph G=(V, E). Each node u∈V is a lane segment and an edge (u, v)∈E indicates that v is a successor, predecessor, left, or right neighbor of u. A route is a directed path of lane segments $u_0, \ldots, u_L$ in G. This gives a compact yet interpretable representation of an agent's goal that captures time-invariant semantics (, whether to go straight or turn) without constraining the agent to a specific sequence of actions. The key challenge is to learn a reactive route-conditional policy with human-like behaviors.

To train the system, one or more embodiments may use gradient-based optimization to learn the policy parameters θ in closed-loop simulation. Specifically, given a dataset D={$(s_{0:T}, m)$} of real world scenarios, the following imitation objective may be optimized:

$$\theta^\star = \underset{\theta}{\mathrm{argmin}} \mathbb{E}_{(s_{0:T},m)\sim D}\left[\frac{1}{T}\sum_{t=1}^{T} d(s_t, \tilde{s}_t)\right] \tag{8}$$

where $d(s_t, \tilde{s}_t)$ is the Huber loss between the positions of each agent in the ground truth $s_t$ and the simulation $\tilde{s}_t$. The simulation states $\tilde{s}_{1:T}$ are generated by iteratively unrolling the policy $\pi(a_t|s_t, m, g;\theta)$ through from the initial state $s_0$, and given ground truth routes reconstructed from each agent's observed behavior in $s_{0:T}$.

Figure 8:
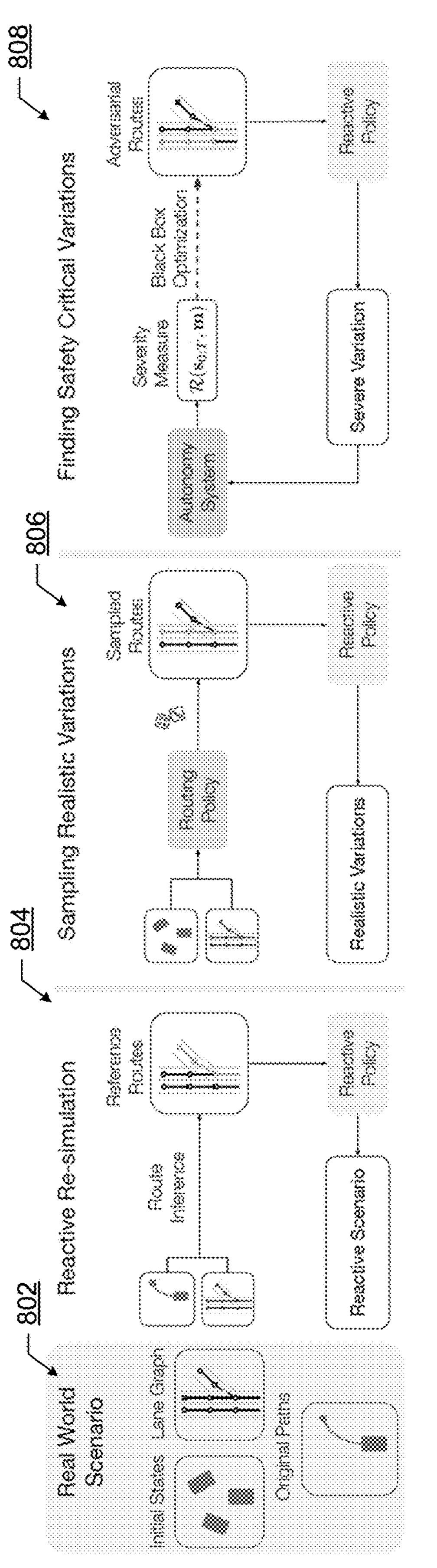
FIG. 8 shows an example block diagram of using mixed reality simulation in accordance with one or more embodiments of the invention.

FIG. 8 shows an example block diagram of using mixed reality simulation in accordance with one or more embodiments of the invention. As shown in FIG. 8, one or more embodiments may be used in at least three ways to simulate mixed reality traffic scenarios. By varying the real world scenarios (802) and routes given to the route-conditional policy, one or more embodiments can use the model for reactive re-simulation (804), sampling realistic variations (806), and finding safety critical variations or scenarios (808). Moreover, one or more embodiments can combine all three ways to simulate nuanced what-if scenarios in the form of: "what-if agent A cuts in front of the SDV, while agents behind the SDV react realistically, and other agents follow alternative routes."

As shown in the reactive re-simulation diagram (804), to build a digital twin of a scenario, the first step is to infer the routes underlying each agent's original trajectory. To perform the inference, one or more embodiments adapt a hidden Markov model (HMM) for map matching. Specifically, one or more embodiments model the joint distribution over an agent's states $s_{i,0:T}$ and underlying route $g_i$ with an HMM, where $s_{i,0:T}$ are the observations and the lane segments in $g_i$ are the hidden variables. One or more embodiments can then estimate an agent's maximum a posteriori route using the Viterbi algorithm, $$g_i^\star = \underset{g_i}{\mathrm{argmax}}\, x p^{kmm}(g_i \mid s_{i,0:T}) \tag{9}$$

One or more embodiments repeat this process for all agents in the scenario. From here, reactive re-simulation simply amounts to unrolling the route-conditional policy $\pi(a_t|s_t, m, g^*; \theta)$ through equations (6) and (7) in closed-loop simulation.

As shown in the sampling realistic variations diagram (806), beyond reactive re-simulation, one or more embodiments can learn a routing policy $h(g|s_0, m; \phi)$ from which one or more embodiments can sample realistic routes to simulate plausible variations of a real world scenario. The routing policy models the generative process of an agent's route as an autoregressive traversal over the lane graph G=(V, E), $$h_i(g_i \mid u_0, s_0, m; \phi) = \prod_{j=0}^{L} h_i^{edge}(u_{j+1} \mid u_j, s_0, m; \phi) \quad (10)$$

where $g_i$ is the route $u_0, \ldots, u_L$. Concretely, one or more embodiments parameterize $h^{edge}$ with a similar architecture as that of the route-conditional policy, differing only in their respective decoders. For each agent i and edge (u, v), one or more embodiments concatenate agent features with lane graph features of u and v and use an MLP to predict a logit. Then, one or more embodiments decode the transition probability from $u_j$ by taking the softmax over outgoing edges $\{(u, v) \in E: u=u_j\}$. The policy is trained to maximize the likelihood of ground truth routes.

To sample a scenario, one or more embodiments start by associating each agent to its closest lane graph node $u_0 \in V$ at t=0. Then, one or more embodiments iteratively sample edges from $$h_i^{edge}(u_{j+1} \mid u_j, s_0, m; \phi)$$

until termination, yielding a route sample, $$g^*_i \sim h_i(g_i | s_0, m; \phi) \quad (11)$$

As before, one or more embodiments unroll the reactive policy to simulate a realistic variation of the original scenario.

As shown in the finding safety critical variations diagram (808), one aspect of autonomous system evaluation is stress testing the behavior of the virtual driver in safety critical scenarios. One or more embodiments enable efficient search over routes to discover realistic yet safety critical interactions with the autonomous system. To do this, one or more embodiments generate agent routes under an adversarial framework. Given a real world scenario, one or more embodiments determine the set of candidate agents that are capable of interacting with the autonomous system sample them to have an adversarial route. Then, the goal is to obtain route $g^*_i$ which maximizes a severity measure $\mathcal{R}$ to induce a safety critical scenario, $$g_i^\star = \underset{g_i}{\operatorname{argmax}} \mathcal{R}(s_{0:T}, m) \quad (12)$$

One or more embodiments may choose $\mathcal{R}$ as the autonomous system's minimum distance to a collision. Here $s_{0:T}$ are the simulation states generated by unrolling the reactive policy and the autonomous system through equations (7) and (8). Notably, one or more embodiments also re-simulate the other agents to enable realistic closed-loop interactions. Since $\mathcal{R}(s_{0:T}, m)$ is a complex function of the autonomy model in a dynamic simulation environment, one or more embodiments treat it as a black-box function and use Bayesian Optimization to solve the maximization problem.

Figure 9:
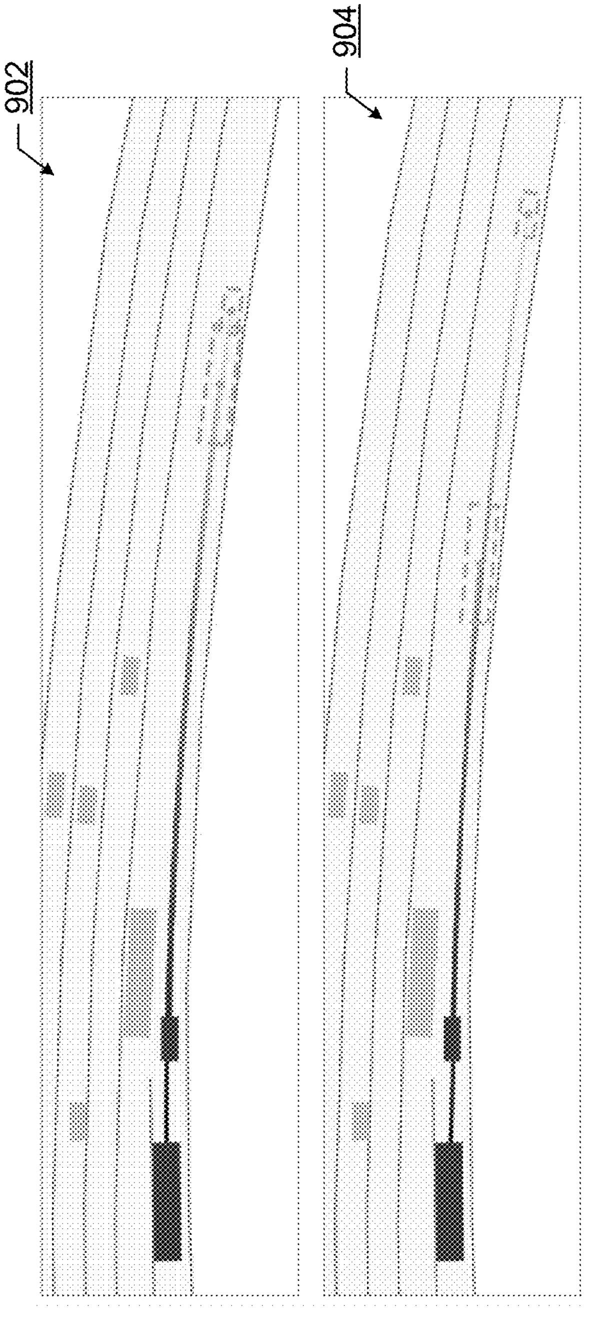
FIG. 9 shows an example diagram of reactive re-simulation in accordance with one or more embodiments of the invention.

FIG. 9 shows an example diagram of reactive re-simulation in accordance with one or more embodiments of the invention. Specifically, in FIG. 9 consider the scenario in which the autonomous system (denoted by the front driver) deviates from the real world system. In a pure replay scenario (902), the agent whose actions are being replayed crashes into the back of the autonomous system regardless of the amount of time that the replay agent had to stop because replay merely keeps the agents in the same geographic position at the timestep as in the real world. However, as shown in the reactive re-simulation scenario (904), embodiments adjust the positioning of agents to match realistically how agents may react. Namely, with sufficient stopping distance and time, the agent behind the autonomous system would stop to avoid collision. Thus, the reactive re-simulation is a more realistic view of the real world.

Figure 10:
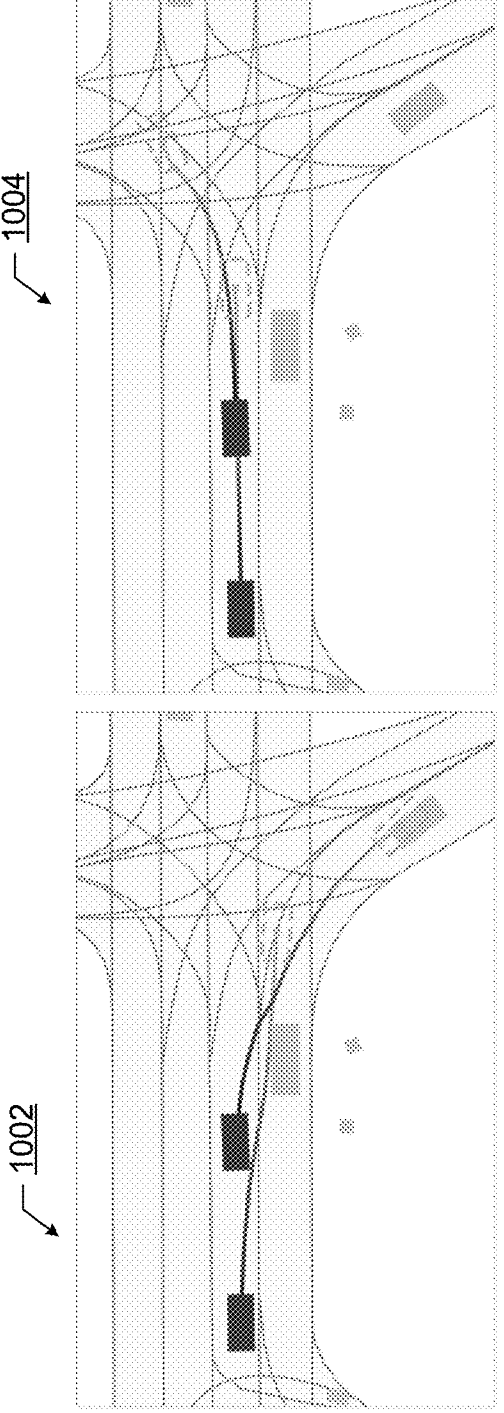
FIG. 10 shows an example diagram of generating multiple agent routes in accordance with one or more embodiments of the invention.

FIG. 10 shows an example diagram of generating multiple agent routes and different trajectories in accordance with one or more embodiments of the invention. Scenarios (1002, 1004) provide different scenarios that may be generated. Each scenario may be analyzed to identify which scenarios may result in a collision. Such scenarios are adversarial to the virtual driver. The virtual driver may then be tested with adversarial scenarios to determine whether the virtual driver is safe to operate in the real world.

Figure 11:
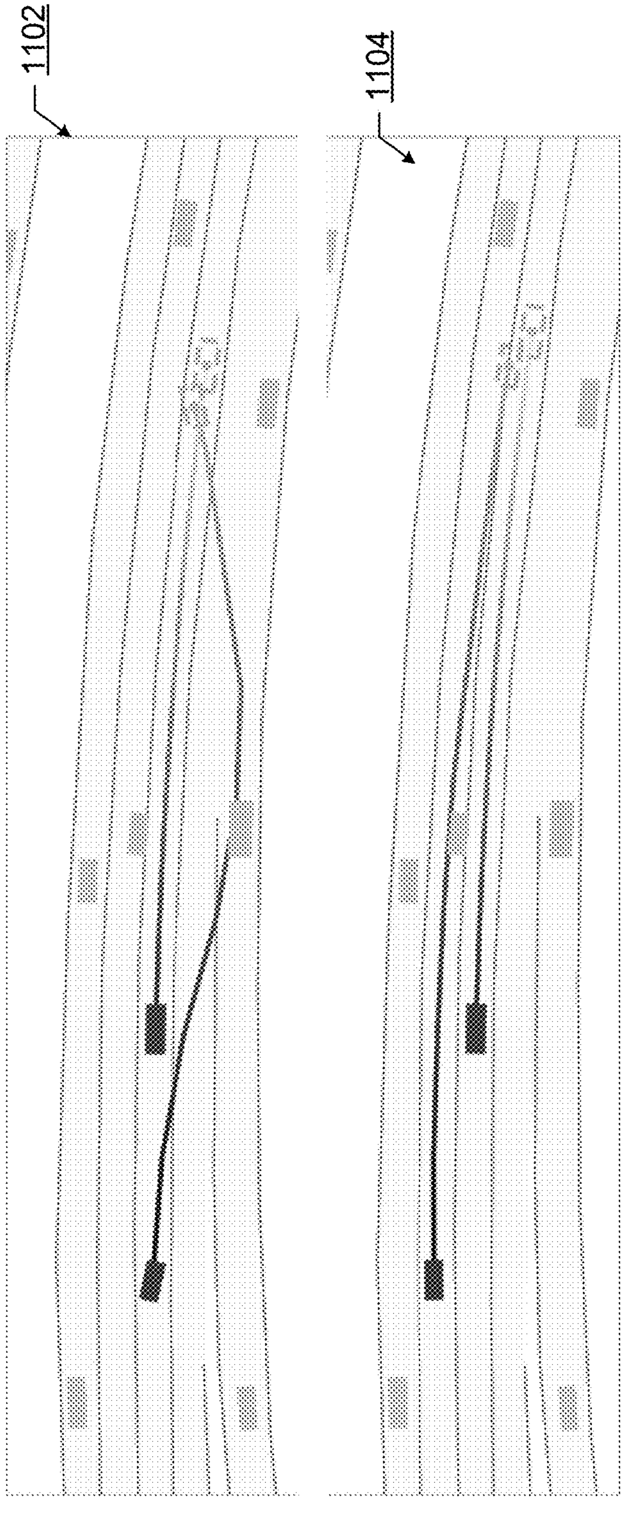
FIG. 11 shows an example of generating realistic safety critical situations in accordance with one or more embodiments of the invention.

FIG. 11 shows an example of generating realistic safety critical situations in accordance with one or more embodiments of the invention. A challenge is in identifying realistic safety critical scenarios. For example, FIG. 11 shows an unrealistic safety critical scenario (1102) and a more realistic safety critical scenario (1104). The unrealistic safety critical scenario (1102) may be generated by other methodologies that do not distinguish between realistic and unrealistic trajectories. The realistic safety critical scenario (1104) is generated in accordance with disclosed embodiments and shows how one or more embodiments can identify the safety critical scenarios. Thus, the training or testing of the virtual driver would be using more realistic mixed reality scenarios.

The following is an example implementation of the model architecture that may be used. Specifically, the following is an example of the various components of FIG. 4. The following is for example only and not intended to limit the scope of the claims unless expressly required by the claims.

The agent encoder may be a one dimensional residual neural network (ResNet) followed by a gated recurrent unit (GRU) that extracts agent features $h_{agent}=f_{agent}(s_t)$ from the joint agent states $s_t$. Each agent's state $s_{i,t}$ is a sliding window of its position, heading, 2D bounding box, and velocity over the past H time-steps. Intuitively, the one dimensional convolutional neural network may capture local temporal patterns and the GRU aggregates them into a global feature. Unlike the map element encoder in some embodiments, the agent encoder may be run at every step of the simulation.

The map element encoder may be a graph convolutional network (GCN) that extracts map features $h_{map}=f_{map}(G)$ from a given lane graph G. One or more embodiments may use hidden channel dimensions, layer normalization (LN), and max pooling aggregation. Since map features are static, the map features may be computed once and cached between simulations thereafter.

The interaction encoder generates the interaction encoding (i.e., agent-to-agent, agent-to-map, and map-to-map). The interaction encoder may first build a heterogeneous spatial graph G' by adding agent nodes to the original lane graph G. In addition to the original lane graph edges, one or more embodiments also connect agent nodes to their closest lane graph nodes and fully connect the agent nodes to each other. Then, one or more embodiments use the interaction encoder parameterized by a heterogeneous graph neural network (HeteroGNN) to process map features and agent features into fused features, $$h_{map}', h_{agent}' = f_{scene}(h_{map}, h_{agent}) \tag{13}$$

The contextual features form the input to the route-conditional policy decoder (i.e., action decoder) and the routing policy decoder (i.e., modified route generator).

The action decoder may be independent per agent but computation is batched for efficiency. In the following description, the inference for a single agent is described but the subscript i is omitted for brevity. The action decoder may first pre-process the route by truncating the route to a sliding window of a set number of lane graph nodes (e.g., ten), starting at the node closest to the agent at time t. Then, one or more embodiments build a heterogeneous graph consisting of only the considered agent and lane graph nodes in its route. One or more embodiments use a HeteroGNN to fuse features into a single route feature, $$h_{route} = \text{HeteroGNN}(\{h_{map}'(v) | v \in R\}, h_{agent}') \tag{14}$$

and one or more embodiments concatenate these route features with the agent's state features $h_{agent}'$. Finally, one or more embodiments pass the concatenated features into a 4-layer MLP with multiple hidden dimensions to predict the agent's acceleration and steering angle, $$a_t = \text{MLP}([h_{route}, h_{agent}']) \tag{15}$$

The modified route generator may use a simple MLP-based architecture to parameterize the transition probability between lane graph nodes for each agent. Concretely, for each pair of agent i and lane graph edge (u, v), one or more embodiments first concatenate the agent and edge features and then pass it through a 3-layer MLP with multiple hidden dimensions to generate a score, $$f_{score}(u, v) = \text{MLP}([h_{map}'(u), h_{map}'(v), h_{agent}']) \tag{16}$$

One or more embodiments decode the transition probability by taking a softmax over the logits of the outgoing edges, $$h_i^{edge}(u_{j+1} \mid u_j, s_0, m; \phi) = \frac{\exp f_{score}(u_j, u_{j+1})}{\Sigma_{(u_j, v) \in E} \exp f_{score}(u_j, v)} \tag{17}$$

Route reconstruction for reactive re-simulation may be performed as follows. A hidden Markov model (HMM) for map matching may be used to reconstruct each agent's route from its trajectory in the original scenario. Let $x_t \in \mathbb{R}$ denote the agent's 2D bird's eye view position at time t. Given a lane graph G=(V, E), let $z_t$ denote the lane segment u ∈ V that best explains the agent's position $x_t$ at time t. One or more embodiments model the joint distribution over the agent's trajectory $x_{0:T}$ and its associated lane segments $z_{0:T}$ with an HMM, where $x_{0:T}$ are the observations and $z_{0:T}$ are the hidden variables, $$p(x_{0:T}, z_{0:T}) = p(z_0)p(x_0 \mid z_0)\prod_{t=1}^{T} p(z_t \mid z_{t-1})p(x_t \mid z_t) \tag{18}$$

Under this formulation, one or more embodiments can determine the maximum a posteriori route $z_{\text{-}}, \ldots, z_T$ using the Viterbi algorithm, $$z_{0:T}^{\star} = \underset{z_{0:T}}{\text{argmax}}(z_{0:T} \mid x_{0:T}) \tag{19}$$

In the above model, the emission probability $p(x_t|z_t)$ may be proportional to the point-to-line distance from $x_t$ to $z_t$, $$p(x_t \mid z_t) \propto -\min_{p \in z_t} \|x_t - p\|_2 \tag{20}$$

The transition probability $p(z_t|z_{t-1})$ may be proportional to the absolute difference between the distance between $z_{t-1}$ and $z_t$ in G and the distance between $z_{t-1}$ and $x_t$, $$p(z_t|z_{t-1}) \propto -|d_G(z_{t-1}, z_t) - \|x_{t-1} - x_t\|_2| \tag{21}$$

where $d_G(z_{t-1}, z_t)$ is the distance along the shortest directed path connecting $z_{t-1}$ and $z_t$ in G. Note that $d_G(z_{t-1}, z_t)=\infty$ for any pair of disconnected lane segments $z_{t-1}$ and $z_t$; thus, topologically infeasible transitions (and, by extension, routes) are impossible under our model.

To determine the severity measure for finding safety critical variations, the following process may be used in accordance with one or more embodiments. The severity measure $\mathcal{R}(s_{0:T}, m)$ can be tuned to target different outcomes. For example, one or more embodiments may target collisions between the autonomous system and any other agent. One or more embodiments use a continuous measure for collision: the "buffer" distance between (the surfaces of) the autonomous system and the nearest other agent, $$MinBuffer = \min_{0:T}(dist_{buffer}(SDV)) \tag{22}$$

If the minimum buffer distance during a scenario is zero, there is a collision. The minimum buffer distance is locally flat when the adversary A is never the closest object to the autonomous system. Thus, in practice, an additional adversary-to-autonomous system distance term encourages the adversary to approach the autonomous system, $$AdvToSDV = \max\left(\min_{0:T} dist(SDV, A) - 10, 0\right) \tag{23}$$

When close enough (within 10 meters) to produce a safety critical scenarios, the term becomes a constant.

Together, one or more embodiments may minimize the sum of MinBuffer and AdvToSDV. For example, in the formulation of finding safety critical variations as a maximization problem, the severity measure may be calculated as, $$\mathcal{R}(s_{):T}, m) = -\text{MinBuffer} - \text{AdvToSDV} \tag{24}$$

As shown, one or more embodiments provide a machine learning approach to generate mixed reality scenarios that are realistic and reactive to decisions made by the virtual driver. Although not explicitly described above, embodiments may be used in a gaming platform in which the virtual driver is a player of the game. In such a scenario, multiple such virtual drivers may simultaneously exist and perform operations.

Figure 12A:
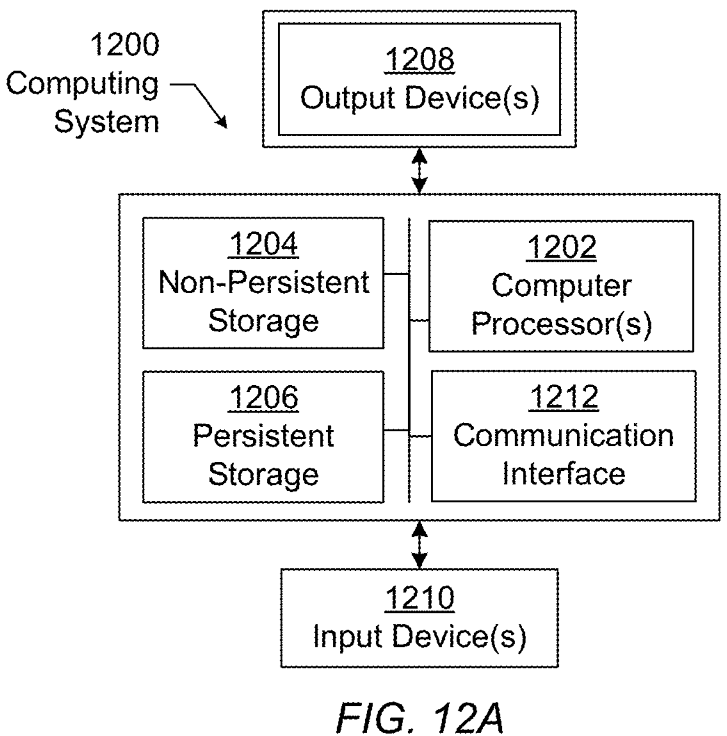
FIGS. 12A and 12B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 12A, the computing system (1200) may include one or more computer processors (1202), non-persistent storage (1204), persistent storage (1206), a communication interface (1212) (e.g., Bluetooth interface, infrared interface, network interface, optical interface, etc.), and numerous other elements and functionalities that implement the features and elements of the disclosure. The computer processor(s) (1202) may be an integrated circuit for processing instructions. The computer processor(s) may be one or more cores or micro-cores of a processor. The computer processor(s) (1202) includes one or more processors. The one or more processors may include a central processing unit (CPU), a graphics processing unit (GPU), a tensor processing unit (TPU), combinations thereof, etc.

The input devices (1210) may include a touchscreen, keyboard, mouse, microphone, touchpad, electronic pen, or any other type of input device. The input devices (1210) may receive inputs from a user that are responsive to data and messages presented by the output devices (1208). The inputs may include text input, audio input, video input, etc., which may be processed and transmitted by the computing system (1200) in accordance with the disclosure. The communication interface (1212) may include an integrated circuit for connecting the computing system (1200) to a network (not shown) (e.g., a local area network (LAN), a wide area network (WAN) such as the Internet, mobile network, or any other type of network) and/or to another device, such as another computing device.

Further, the output devices (1208) may include a display device, a printer, external storage, or any other output device. One or more of the output devices may be the same or different from the input device(s). The input and output device(s) may be locally or remotely connected to the computer processor(s) (1202). Many different types of computing systems exist, and the aforementioned input and output device(s) may take other forms. The output devices (1208) may display data and messages that are transmitted and received by the computing system (1200). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 12B:
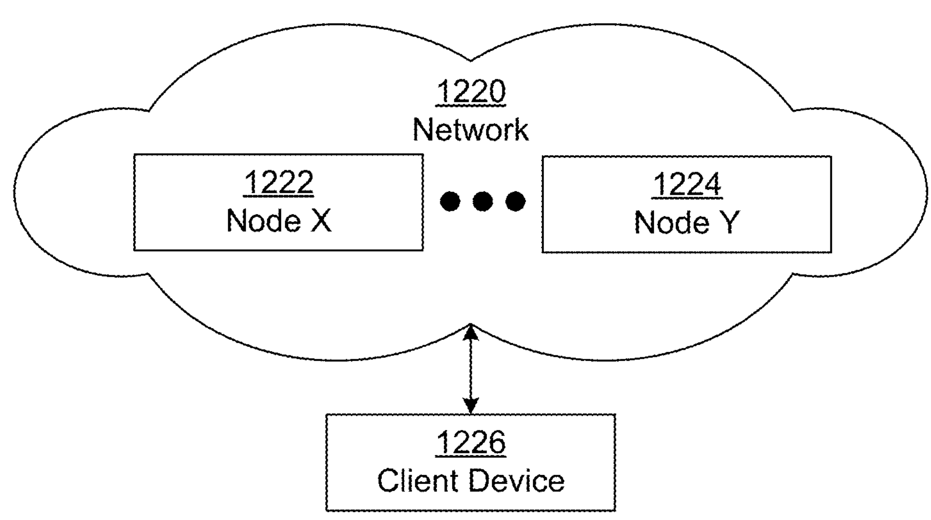

The computing system (1200) in FIG. 12A may be connected to or be a part of a network. For example, as shown in FIG. 12B, the network (1220) may include multiple nodes (e.g., node X (1222), node Y (1224)). Each node may correspond to a computing system, such as the computing system shown in FIG. 12A, or a group of nodes combined may correspond to the computing system shown in FIG. 12A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1200) may be located at a remote location and connected to the other elements over a network.

The nodes (e.g., node X (1222), node Y (1224)) in the network (1220) may be configured to provide services for a client device (1226), including receiving requests and transmitting responses to the client device (1226). For example, the nodes may be part of a cloud computing system. The client device (1226) may be a computing system, such as the computing system shown in FIG. 12A. Further, the client device (1226) may include and/or perform all or a portion of one or more embodiments.

The computing system of FIG. 12A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

obtaining, from sensor data, map data of a geographic region and a plurality of trajectories of a plurality of agents located in the geographic region, wherein the plurality of agents and the map data have a corresponding physical location in the geographic region;

generating, from the map data and the plurality of trajectories, a heterogeneous graph comprising a map layer and an agent layer, wherein generating the heterogeneous graph comprises:

generating, in the map layer, plurality of map element nodes for a plurality of map elements defined in the map data, the plurality of map element nodes connected by a first plurality of edges based on relative positions between the plurality of map elements, processing the map layer by a map element encoder to add a plurality of map element encodings to the map layer of the heterogeneous graph, generating, in the agent layer, a plurality of agent nodes for the plurality of agents, the plurality of agent nodes connected by a second plurality of edges identifying relative positions of the plurality of agents, the plurality of agent nodes comprising an agent encoding, generated by an agent encoder, wherein the agent encoding encodes a plurality of relative historical positions of a corresponding agent with respect to a current position of the corresponding agent, connecting, to generate the heterogeneous graph, the plurality of agent nodes to the plurality of map element nodes based on the relative positions between the plurality of agents and the plurality of map elements, processing the agent layer and the map layer through an interaction encoder that adds a set of edges connecting the plurality of agent nodes to the plurality of map element nodes, and generating, by the interaction encoder executing a graph neural network, an interaction encoding by updating the plurality of map element encodings and the agent encoding of the plurality of agent nodes according to the set of edges;

determining, for an agent of the plurality of agents, an agent route from a trajectory of the plurality of trajectories that corresponds to the agent;

generating, by an agent attribute encoder, from the interaction encoding, an agent attribute encoding that encodes the agent and the agent route;

processing the agent attribute encoding to generate positional information for the agent;

updating the trajectory of the agent using the positional information to obtain an updated trajectory; and outputting the updated trajectory.

2. The method of claim 1, wherein the positional information is kinematic information, and wherein the method further comprises:

processing the kinematic information to determine a new agent position of the agent, wherein the trajectory of the agent is updated using the new agent position of the agent.

3. The method of claim 1, wherein an output of the agent attribute encoding comprises a new agent position of the agent, wherein updating the trajectory of the agent comprises adding the new agent position to the trajectory.

4. The method of claim 1, further comprising:

iteratively:

encoding, by an encoder model of the interaction encoder, a new interaction encoding that encodes the plurality of trajectories and the map data, the plurality of trajectories comprising the updated trajectory, generating, from the new interaction encoding, a new agent attribute encoding of the agent and the agent route, processing the new agent attribute encoding to generate new kinematic information for the agent, and updating the trajectory of the agent using the new kinematic information to generate the updated trajectory.

5. The method of claim 1, further comprising:

over a plurality of iterations to generate the agent route:

generating a plurality of possible transitions of the agent, the plurality of possible transitions comprising the agent encoding, a source location in the geographic region, and a target location in the geographic region, processing, by a routing decoder, the plurality of possible transitions to generate a corresponding score, and sampling, the plurality of possible transitions based on the corresponding score to select a transition of the plurality of possible transitions to obtain a selected transition, wherein the target location of the selected transition is used as the source location in a next iteration of the plurality of iterations.

6. The method of claim 5, wherein the routing decoder is a multilayer perceptron model that uses an agent encoding extracted from the interaction encoding.

7. The method of claim 1, further comprising:

modeling a joint distribution over the trajectory and corresponding lane segments in the map data, wherein determining the agent route comprises selecting a maximum posterior route as the agent route.

8. The method of claim 1, further comprising:

generating a plurality of agent routes of the agent; and analyzing the plurality of agent routes to identify a subset of the plurality of agent routes having a safety critical scenario with an autonomous system, wherein determining the agent route comprises selecting the agent route from the subset of the plurality of agent routes.

9. The method of claim 1, further comprising:

calculating, from the trajectory of the agent, the plurality of relative historical positions of the agent with respect to the current position of the agent; and generating the agent encoding of the agent.

10. The method of claim 1, further comprising:

extracting, from the interaction encoding, the agent encoding of the agent, extracting, from the interaction encoding, the plurality of map element encodings of the agent route, wherein generating the agent attribute encoding comprises:

combining the plurality of map element encodings with the agent encoding to generate a combined graph, and processing the combined graph through the graph neural network.

11. The method of claim 1, wherein the agent route is specified as a path in a lane graph generated from the map data in the geographic region.

12. A system comprising:

a computer processor; and non-transitory computer readable medium for causing the computer processor to perform operations comprising:

obtaining, from sensor data, map data of a geographic region and a plurality of trajectories of a plurality of agents located in the geographic region, wherein the plurality of agents and the map data have a corresponding physical location in the geographic region, generating, from the map data and the plurality of trajectories, a heterogeneous graph comprising a map layer and an agent layer, wherein generating the heterogeneous graph comprises:

generating, in the map layer, plurality of map element nodes for a plurality of map elements defined in the map data, the plurality of map element nodes connected by a first plurality of edges based on relative positions between the plurality of map elements, processing the map layer by a map element encoder to add a plurality of map element encodings to the map layer of the heterogeneous graph, generating, in the agent layer, a plurality of agent nodes for the plurality of agents, the plurality of agent nodes connected by a second plurality of edges identifying relative positions of the plurality of agents, the plurality of agent nodes comprising an agent encoding, generated by an agent encoder, wherein the agent encoding encodes a plurality of relative historical positions of a corresponding agent with respect to a current position of the corresponding agent, connecting, to generate the heterogeneous graph, the plurality of agent nodes to the plurality of map element nodes based on the relative positions between the plurality of agents and the plurality of map elements, processing the agent layer and the map layer through an interaction encoder that adds a set of edges connecting the plurality of agent nodes to the plurality of map element nodes, and generating, by the interaction encoder executing a graph neural network, an interaction encoding by updating the plurality of map element encodings and the agent encoding of the plurality of agent nodes according to the set of edges, determining, for an agent of the plurality of agents, an agent route from a trajectory of the plurality of trajectories that corresponds to the agent, generating, by an agent attribute encoder, from the interaction encoding, an agent attribute encoding that encodes the agent and the agent route, processing the agent attribute encoding to generate positional information for the agent, updating the trajectory of the agent using the positional information to obtain an updated trajectory, and outputting the updated trajectory.

13. The system of claim 12, wherein the operations further comprise:

iteratively:

encoding, by encoder model of the interaction encoder, a new interaction encoding that encodes the plurality of trajectories and the map data, the plurality of trajectories comprising the updated trajectory, generating, from the new interaction encoding, a new agent attribute encoding of the agent and the agent route, processing the new agent attribute encoding to generate new kinematic information for the agent, and updating the trajectory of the agent using the new kinematic information to generate the updated trajectory.

14. The system of claim 12, wherein the operations further comprise:

over a plurality of iterations to generate the agent route:

generating a plurality of possible transitions of the agent, the plurality of possible transitions comprising an agent encoding, a source location in the geographic region, and a target location in the geographic region, processing, by a routing decoder, the plurality of possible transitions to generate a corresponding score, and sampling, the plurality of possible transitions based on the corresponding score to select a transition of the plurality of possible transitions to obtain a selected transition, wherein the target location of the selected transition is used as the source location in a next iteration of the plurality of iterations.

15. The system of claim 12, wherein the operations further comprise modeling a joint distribution over the trajectory and corresponding lane segments in the map data, wherein determining the agent route comprises selecting a maximum posterior route as the agent route.

16. The system of claim 12, wherein the operations further comprise generating a plurality of agent routes of the agent; and analyzing the plurality of agent routes to identify a subset of the plurality of agent routes having a safety critical scenario with an autonomous system, wherein determining the agent route comprises selecting the agent route from the subset of the plurality of agent routes.

17. A non-transitory computer readable medium comprising computer readable program code for causing a computer system to perform operations comprising:

obtaining, from sensor data, map data of a geographic region and a plurality of trajectories of a plurality of agents located in the geographic region, wherein the plurality of agents and the map data have a corresponding physical location in the geographic region;

generating, from the map data and the plurality of trajectories, a heterogeneous graph comprising a map layer and an agent layer, wherein generating the heterogeneous graph comprises:

generating, in the map layer, plurality of map element nodes for a plurality of map elements defined in the map data, the plurality of map element nodes connected by a first plurality of edges based on relative positions between the plurality of map elements, processing the map layer by a map element encoder to add a plurality of map element encodings to the map layer of the heterogeneous graph, generating, in the agent layer, a plurality of agent nodes for the plurality of agents, the plurality of agent nodes connected by a second plurality of edges identifying relative positions of the plurality of agents, the plurality of agent nodes comprising an agent encoding, generated by an agent encoder, wherein the agent encoding encodes a plurality of relative historical positions of a corresponding agent with respect to a current position of the corresponding agent, connecting, to generate the heterogeneous graph, the plurality of agent nodes to the plurality of map element nodes based on the relative positions between the plurality of agents and the plurality of map elements, processing the agent layer and the map layer through an interaction encoder that adds a set of edges connecting the plurality of agent nodes to the plurality of map element nodes, and generating, by the interaction encoder executing a graph neural network, an interaction encoding by updating the plurality of map element encodings and the agent encoding of the plurality of agent nodes according to the set of edges;

determining, for an agent of the plurality of agents, an agent route from a trajectory of the plurality of trajectories that corresponds to the agent;

generating, by an agent attribute encoder, from the interaction encoding, an agent attribute encoding that encodes the agent and the agent route;

processing the agent attribute encoding to generate positional information for the agent;

updating the trajectory of the agent using the positional information to obtain an updated trajectory; and outputting the updated trajectory.

18. The non-transitory computer readable medium of claim 17, wherein the operations further comprise:

iteratively:

encoding, by an encoder model of the encoder model, a new interaction encoding that encodes the plurality of trajectories and the map data, the plurality of trajectories comprising the updated trajectory, generating, from the new interaction encoding, a new agent attribute encoding of the agent and the agent route, processing the new agent attribute encoding to generate new kinematic information for the agent, and updating the trajectory of the agent using the new kinematic information to generate the updated trajectory.

* * * * *